US009977602B2

(12) United States Patent
Kazama

(10) Patent No.: US 9,977,602 B2
(45) Date of Patent: May 22, 2018

(54) STORAGE SYSTEM, STORAGE DEVICE, AND CONTROL METHOD OF STORAGE SYSTEM

(71) Applicant: FUJITSU LIMITED, Kawasaki-shi, Kanagawa (JP)

(72) Inventor: Satoshi Kazama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 413 days.

(21) Appl. No.: 14/271,485

(22) Filed: May 7, 2014

(65) Prior Publication Data
US 2014/0379963 A1 Dec. 25, 2014

(30) Foreign Application Priority Data

Jun. 24, 2013 (JP) .................................. 2013-132124

(51) Int. Cl.
*G06F 12/00* (2006.01)
*G06F 13/00* (2006.01)
*G06F 3/06* (2006.01)

(52) U.S. Cl.
CPC .......... *G06F 3/0611* (2013.01); *G06F 3/0659* (2013.01); *G06F 3/0679* (2013.01); *G06F 3/0656* (2013.01)

(58) Field of Classification Search
CPC .... G06F 3/0611; G06F 3/0679; G06F 3/0659; G06F 3/0656; G06F 3/06; G06F 13/1668;
(Continued)

(56) References Cited

U.S. PATENT DOCUMENTS 3,377,619 A * 4/1968 Marsh ....................... G06F 3/00
710/17
5,287,537 A * 2/1994 Newmark ........... G06F 12/0207
711/E12.003
(Continued)

FOREIGN PATENT DOCUMENTS

JP    2001-266579 A    9/2001
JP    2005-266888       9/2005
(Continued)

OTHER PUBLICATIONS

Micron, "TN-29-19 NAND Flash 101 (Technical Note NAND Flash 101: An Introduction to NAND Flash and How to Design It in to Your Next Product)", published Nov. 2006, Micron Technologies, 28 pages.*

(Continued)

*Primary Examiner* — Sean D Rossiter
(74) *Attorney, Agent, or Firm* — Fujitsu Patent Center

(57) ABSTRACT

The storage device includes multiple NAND devices each of which performs a process on the basis of a command; a command management unit that issues the command from a host to one of the NAND devices specified by the command and that sends an issue completion notification of the issued command to the host; and a state notifying unit that notifies, based on whether each of the NAND devices performs a predetermined process, the host whether each of the NAND devices is ready to accept the command. The host includes a NAND control unit that selects one of the NAND devices that is ready to accept the command based on the notification from the state notifying unit when the issue completion notification is received and sends, to the command management unit, a command to allow the selected one of the NAND devices to perform the process.

9 Claims, 16 Drawing Sheets

(58) Field of Classification Search
CPC .............. G06F 13/1689; G06F 12/0238; G06F 12/0246; G06F 2212/2022; G06F 2212/205; G06F 2212/7206; G06F 3/0688; G06F 12/0835; G06F 9/30087; G06F 13/1615
USPC .......................................................... 711/103
See application file for complete search history.

(56) References Cited

U.S. PATENT DOCUMENTS

| | | | | |
|---|---|---|---|---|
| 8,255,615 | B1* | 8/2012 | Yoon | G06F 13/1668 711/103 |
| 8,301,832 | B1* | 10/2012 | Moore | G06F 3/061 711/103 |
| 8,626,995 | B1* | 1/2014 | Yoon | G06F 13/1668 711/103 |
| 9,348,536 | B1* | 5/2016 | Yoon | G06F 3/0659 |
| 2002/0026600 | A1* | 2/2002 | Jung | G06F 13/1689 713/401 |
| 2002/0174297 | A1* | 11/2002 | McDonald | G06F 3/061 711/114 |
| 2003/0191912 | A1* | 10/2003 | Dortu | G06F 15/7857 711/154 |
| 2008/0109589 | A1* | 5/2008 | Honda | G06F 3/0607 711/103 |
| 2009/0089482 | A1* | 4/2009 | Traister | G06F 12/0246 711/103 |
| 2009/0089492 | A1* | 4/2009 | Yoon | G06F 13/1689 711/103 |
| 2011/0145474 | A1* | 6/2011 | Intrater | G06F 13/385 711/103 |
| 2012/0011335 | A1* | 1/2012 | Asnaashari | G06F 13/161 711/155 |
| 2012/0159052 | A1* | 6/2012 | Lee | G06F 3/0613 711/103 |
| 2013/0117503 | A1* | 5/2013 | Nellans | G06F 12/0246 711/103 |
| 2014/0250262 | A1* | 9/2014 | Buxton | G06F 3/0659 711/103 |
| 2014/0325115 | A1* | 10/2014 | Ramsundar | G06F 12/0238 711/102 |
| 2015/0120993 | A1* | 4/2015 | Higeta | G06F 3/0688 711/103 |
| 2016/0062925 | A1* | 3/2016 | Surapuram | G06F 13/1642 710/106 |

FOREIGN PATENT DOCUMENTS

| | | |
|---|---|---|
| JP | 2011-107928 | 6/2011 |
| JP | 2012-018648 | 1/2012 |

OTHER PUBLICATIONS

Micron, "2Gb: x8, x16 NAND Flash Memory" published Sep. 2010, Micron Technologies, 124 pages.*
Japanese Office Action dated Feb. 28, 2017 for corresponding Japanese Patent Application No. 2013-132124, with Partial English Translation, 10 pages.

* cited by examiner

STORAGE SYSTEM, STORAGE DEVICE, AND CONTROL METHOD OF STORAGE SYSTEM

CROSS-REFERENCE TO RELATED APPLICATION

This application is based upon and claims the benefit of priority of the prior Japanese Patent Application No. 2013-132124, filed on Jun. 24, 2013, the entire contents of which are incorporated herein by reference.

FIELD

The embodiments discussed herein are related to a storage system, a storage device, and a control method of a storage system.

BACKGROUND

In recent years, storage devices, such as memory systems or storage systems, that use nonvolatile memories, such as NAND type flash memory devices (hereinafter, referred to as "NAND devices"), are widely used, as high-speed storage devices faster than hard disks, in information processing apparatuses, such as servers.

NAND devices are controlled by a NAND controller. Furthermore, a host and the NAND controller are connected by, for example, a Peripheral Component Interconnect (PCI) express. Instead of using the PCI express, a Serial Advanced Technology Attachment (SATA), a SAS I/F (Serial Attached Small Computer System Interface (SCSI) interface), or the like may also be used.

In a conventional technology, the band width of data transfer is increased by performing a parallel access on buses for multiple channels between a NAND controller and NAND devices.

For example, the flow of a read process performed in a conventional channel is as follows. Namely, a NAND controller interprets a read command received from the host and issues a read command to a specified NAND device. Then, the NAND device outputs read data and then the NAND controller stores the data in a buffer included in the NAND controller. Thereafter, the NAND controller transfers the read data to the host from a buffer.

There is a conventional technology that reduces the read time period by overlapping data-read commands when an initialization process is performed. Furthermore, there is another conventional technology that switches, by a memory controller, from parallel control to interleave control at high temperatures. Furthermore, there is another conventional technology that improves the performance of a data transfer process by changing the configuration of data burst when data burst transmission is performed.

Patent Document 1: Japanese Laid-open Patent Publication No. 2005-266888
Patent Document 2: Japanese Laid-open Patent Publication No. 2012-018648
Patent Document 3: Japanese Laid-open Patent Publication No. 2011-107928

However, when NAND devices are used, a busy time period for outputting data is long. Consequently, in a conventional read process or write process, because execution of a process needs to be waited during a busy time period, the use efficiency of a bus for each channel is low and thus the transfer efficiency of data is low.

Furthermore, even if the conventional technology that overlaps data-read commands is used when an initialization process is performed, in the read process or write process performed at the time of initialization, it is not possible to overlap the commands during the busy time period; therefore, it is difficult to improve the use efficiency of a bus. Furthermore, even if the conventional technology that switches from parallel control to interleave control at high temperatures, it is difficult to determine, in a controller, whether data can be overlapped. Consequently, because a busy time period is not efficiently used, it is difficult to improve the use efficiency of a bus. Furthermore, even if the conventional technology that changes the configuration of data burst, data transfer is not performed during a busy time period; therefore, it is difficult to improve the use efficiency of a bus. Consequently, it is difficult to improve the use efficiency of a bus even if any conventional technologies are used.

SUMMARY

According to an aspect of an embodiment, a storage system includes: an arithmetic processing device; and a storage device, wherein the storage device includes a plurality of storing units each of which performs a process on the basis of a command that is issued, a command management unit that issues the command from the arithmetic processing device to a storing unit, which is specified by the command and is from among the storing units, and that sends an issue completion notification of the issued command to the arithmetic processing device, and a notifying unit that notifies, on the basis of whether each of the storing units performs a predetermined process, the arithmetic processing device of an acceptable notification each indicating whether each of the storing units can accept the issued command, and the arithmetic processing device includes a storage control unit that selects a specific storing unit which can accept the command from among the storing units on the basis of the acceptable notification from the notifying unit when the issue completion notification is received from the command management unit and that sends, to the command management unit, a command to allow the specific storing unit to perform the process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The storage system, the storage device, and the control method of the storage system disclosed in the present invention are not limited to these embodiments described below.

[a] First Embodiment

Figure 1:
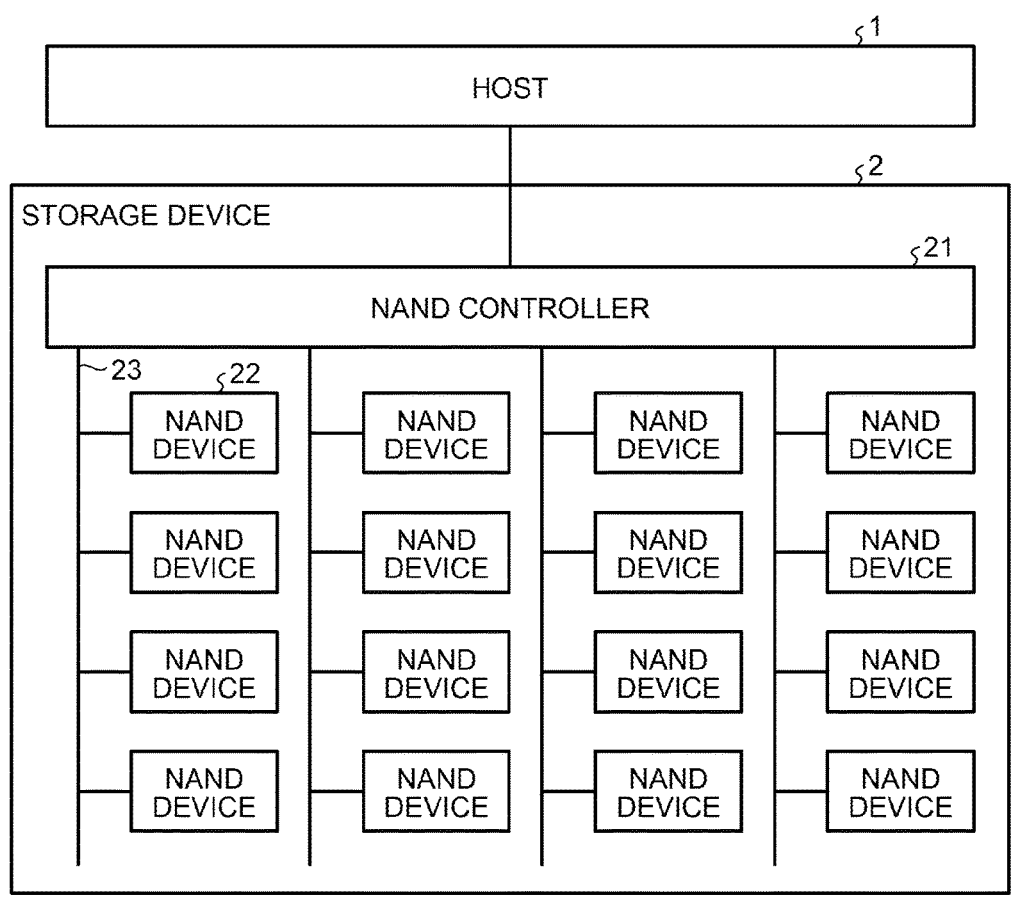
FIG. 1 is a schematic diagram illustrating, in outline, the configuration of a storage system.

FIG. 1 is a schematic diagram illustrating, in outline, the configuration of a storage system. A storage system according to a first embodiment includes a host 1 that is an arithmetic processing device and includes a storage device 2 that is a storage device.

The storage device 2 includes a NAND controller 21 and NAND devices 22 that are connected to the NAND controller 21 via buses 23. The NAND controller 21 includes the buses 23 with four channels to which the NAND devices 22 are connected. Specifically, the NAND controller 21 separately accesses the NAND devices 22 that are connected to the buses 23 with four different channels.

In the following, a description will be given of the overall operation of the storage system when data is read and written. In the host 1, an application or the like is running. The host 1 reads and writes data specified by the application or the like from and to the storage device 2. For example, when the host 1 reads data, the host 1 sends a read command (hereinafter, referred to as a "Read command") to the NAND controller 21 in the storage device 2. Then, the host 1 receives the data specified by the Read command from the NAND controller 21.

Furthermore, for example, the host 1 writes data, the host 1 sends data to be written and a write command (hereinafter, referred to as a "Write command") to the NAND controller 21 in the storage device 2.

When the NAND controller 21 receives a Read command, the NAND controller 21 sends the Read command to one of the NAND devices 22 specified by the Read command. Then, the NAND controller 21 receives data specified by the Read command from the NAND device 22. Then, the NAND controller 21 sends the received data to the host 1.

Furthermore, when the NAND controller 21 receives the data to be written and a Write command, the NAND controller 21 sends, to one of the NAND devices 22 specified by the Write command, the Write command together with the data to be written.

Figure 2:
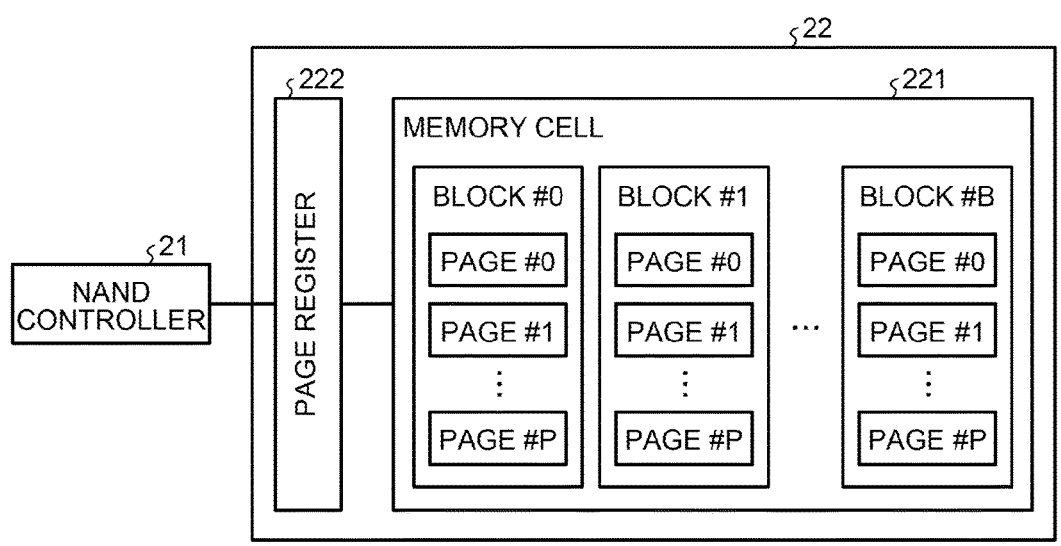
FIG. 2 is a schematic diagram illustrating the internal structure of a NAND device.

The NAND device 22 includes, as illustrated in FIG. 2, a memory cell 221 that stores therein data and a page register 222 that is a buffer. FIG. 2 is a schematic diagram illustrating the internal structure of a NAND device. The memory cell 221 is divided into pages, which are used as units for writing data, i.e., data is written per page. Furthermore, blocks, which are used as units for deleting data, i.e., data is deleted per block. The memory cell 221 includes multiple blocks.

When the NAND device 22 receives a Read command from the NAND controller 21, the NAND device 22 reads the data specified by the Read command from the memory cell 221 to the page register 222. When the NAND device 22 is reading the data from a cell to the page register 222, the NAND device 22 is in a Busy state, i.e., in a state in which the NAND device 22 does not accept a command. Then, the NAND device 22 sends, to the NAND controller 21, the data that has been read to the page register 222.

Furthermore, the NAND device 22 receives a Write command from the NAND controller 21 and then stores, in the page register 222, the received data to be written. Then, the NAND device 22 reads, from the page register 222, the received data to be written and then writes the data to the memory cell 221. When the data is being moved from the page register 222 to the memory cell 221, the NAND device 22 is in a Busy state.

In the conventional technology, if one of the NAND devices 22 in a channel is in a Busy state, the NAND controller 21 waits until the NAND device 22 becomes in a Ready state and then starts another process that is performed on the NAND device 22 in that channel. Consequently, in a conventional technology, the standby time for which this Busy state ends is wasted. However, as described below, the storage system according to the embodiment performs an overlap process in which a process is performed, without waiting for a state in which the Busy state of the NAND device 22 ends, i.e., without waiting for a state in which the Busy state of the NAND device 22 becomes in a Ready state, on another one of the NAND devices 22 that is in a Ready state in the same channel. Thus, in the following, a description will be given, in detail, of a process performed when the storage system according to the first embodiment writes and reads data.

Figure 3:
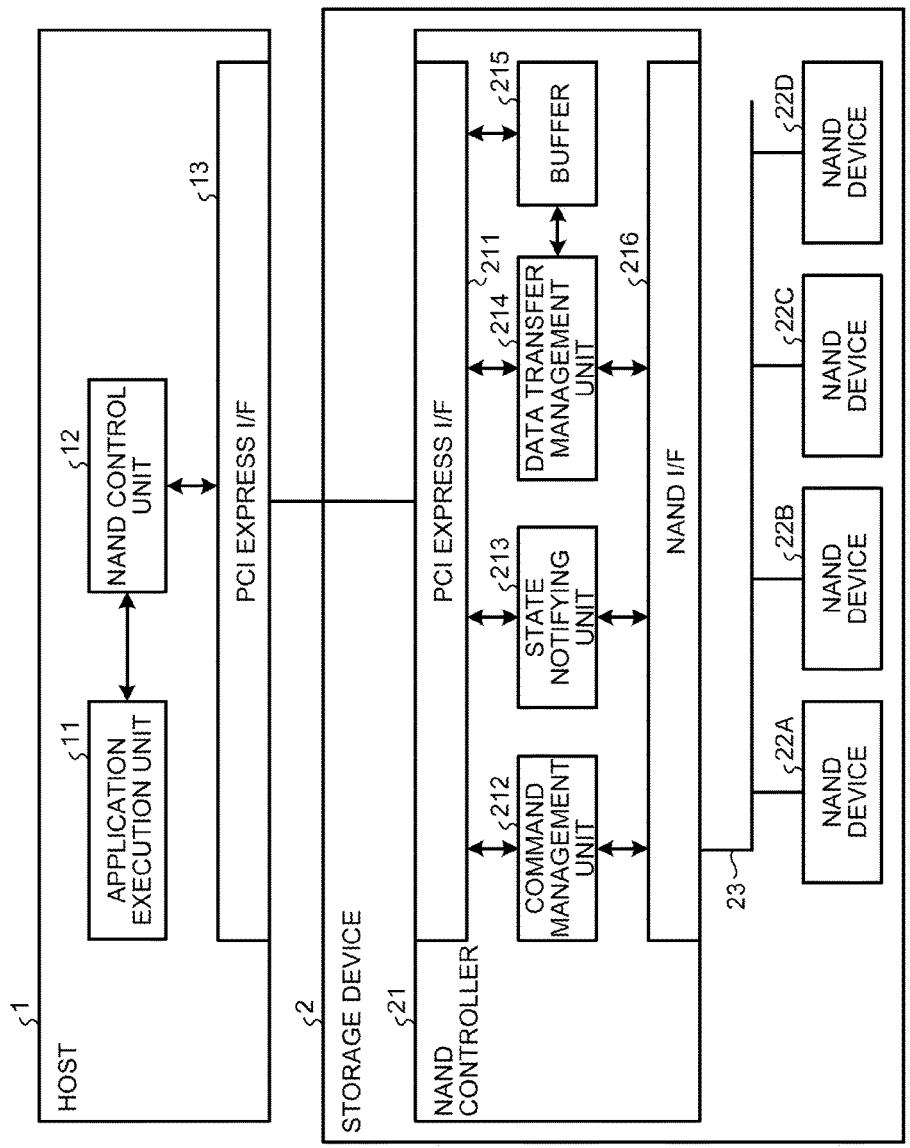
FIG. 3 is a block diagram illustrating, in detail, the storage system according to a first embodiment.

FIG. 3 is a block diagram illustrating, in detail, the storage system according to a first embodiment. In a description below, the reading and the writing of data performed on the NAND devices 22 in a single channel will be described; therefore, a single channel is illustrated in FIG. 3 as the bus 23. Furthermore, in the first embodiment, four NAND devices 22, i.e., NAND devices 22A to 22D, are connected to the single channel that is the bus 23. In a description below, the NAND devices 22A to 22D are simply referred to as the "NAND device 22" as long as the NAND devices 22A to 22D need not be distinguished.

As illustrated in FIG. 3, the host 1 according to the first embodiment includes an application execution unit 11, a NAND control unit 12, and a PCI express interface (I/F) 13.

The application execution unit 11 executes various applications. Furthermore, the application execution unit 11 instructs the NAND control unit 12 to write and read data specified by the application. At this point, the application execution unit 11 determines whether data to be written to the NAND device 22 has a data pattern in which data can be separately written into the different NAND devices 22 and each piece of the written data can be separately read from each of the NAND devices 22. If data to be written has such a data pattern, the application execution unit 11 instructs the NAND control unit 12 to execute an overlap process, which will be described below. Then, the application execution unit 11 stores therein the data that has been written by executing the overlap process and reads the data by executing the overlap process when the data is read. In the following, a description will be given of a case in which the application execution unit 11 instructs to execute the overlap process.

The PCI express I/F 13 is an interface on the host 1 side used for communication between the NAND controller 21 and the NAND control unit 12. The NAND control unit 12 communicates with the NAND controller 21 via the PCI express I/F 13. In the first embodiment, communication is performed by using the PCI express; however, the communication standard is not limited thereto. For example, another communication standard, such as SATA or SAS I/F may also be used. In practice, the NAND control unit 12 communicates with the NAND controller 21 via the PCI express I/F 13. However, in a description below, for convenience of description, a description will sometimes be given as if the NAND control unit 12 directly communicates with the NAND controller 21.

When data is read, the NAND control unit 12 receives, from the application execution unit 11, an instruction to perform an overlap process for reading the data. Then, the NAND control unit 12 sends, to a command management unit 212 in the NAND controller 21, a Read command for the NAND device 22 from which the data is read. In a description below, a case in which the NAND control unit 12 sends, to the command management unit 212, a Read command for the NAND device 22 from which the data is read means a case in which the NAND control unit 12 issues a Read command to the NAND device 22.

Then, the NAND control unit 12 receives a notification from the command management unit 212 indicating that the Read command has been issued. If data that is subsequently to be read is in one of the NAND devices 22 in the same channel is present, the NAND control unit 12 issues a Read command to the NAND device 22 from which the subsequent data is read. In this way, the NAND control unit 12 repeatedly issues a Read command until the NAND device 22, from which data is subsequently read is not present in the same channel. Specifically, when data is read, the NAND control unit 12 sequentially issues a Read command to all of the NAND devices 22 that stores therein divided data obtained from the data that is specified to be read. For example, if a single piece of data is divided into pieces and then the pieces of data are stored in all of the NAND devices 22A to 22D in a distributed manner, the NAND control unit 12 sequentially issues a Read command to all of the NAND devices 22A to 22D.

Then, the NAND control unit 12 periodically sends, to a state notifying unit 213, a state notification request as a query as to whether each of the NAND devices 22 is in a Busy state or a Ready state and performs polling for the state notification request. When a response to the state notification request from the state notifying unit 213 is changed to the Ready state, the NAND control unit 12 determines that the state of the subject NAND device 22 shifts from the Busy state to the Ready state.

After sending the Read command to all of the NAND devices 22, in each of which the divided data is stored, in the same channel, the NAND control unit 12 determines whether the NAND device 22 that has shifted from the Busy state to the Ready state is present. If the NAND device 22 that has shifted to the Ready state is present, the NAND control unit 12 instructs a data transfer management unit 214 in the NAND controller 21 to start a data transfer from the page register 222 in the subject NAND device 22 to a buffer 215 in the NAND controller 21. For example, if the NAND device 22A shifts from the Busy state to the Ready state, the NAND control unit 12 instructs the data transfer management unit 214 to start the data transfer from the page register 222 in the NAND device 22A to the buffer 215. In the following, a description will be given of a case in which the NAND control unit 12 instructs the NAND device 22A to start a data transfer.

Then, the NAND control unit 12 determines whether data is to be read from another page in the NAND device 22A. If it is determined that data is read from another page, the NAND control unit 12 waits until the data transfer from the NAND device 22A to the buffer 215 is completed. If the data transfer has been completed, the NAND control unit 12 further issues a Read command to the NAND device 22A.

Thereafter, if the NAND control unit 12 receives a notification from the command management unit 212 indicating that a Read command has been issued to the NAND device 22A, the NAND control unit 12 instructs the data transfer management unit 214 to perform a data transfer from the buffer 215 to the host 1.

Then, the NAND control unit 12 receives the data sent from the buffer 215.

After the NAND control unit 12 has received the data from the buffer 215, the NAND control unit 12 repeats the process described above until the reading of the data is completed. Specifically, the NAND control unit 12 detects the NAND device 22 that has shifted to the Ready state and then transfers the data from the page register 222 in the detected NAND device 22 to the buffer 215. Furthermore, the NAND control unit 12 determines whether data is to be read from another page in the NAND device 22 that is currently transferring the data and then sends a Read command. Then, the NAND control unit 12 allows the data transfer management unit 214 to perform data transfer from the buffer 215 to the host 1. The NAND control unit 12 repeats this process.

In the following, the writing of data will be described. The NAND control unit 12 receives, from the application execution unit 11, an instruction to perform the overlap process for writing the data. Then, the NAND control unit 12 transfers data to be written to the buffer 215 in the NAND controller 21.

Then, the NAND control unit 12 sends, to the command management unit 212 in the NAND controller 21, a Write command for the NAND device 22 to which the data is written. In a description below, a case in which the NAND control unit 12 sends, to the command management unit 212, a Write command for the NAND device 22 to which the data is written means a case in which the NAND control unit 12 issues a Write command to the NAND device 22.

Then, the NAND control unit 12 receives a notification from the command management unit 212 indicating that the Write command has been issued. Then, the NAND control unit 12 instructs the data transfer management unit 214 to start a data transfer from the buffer 215 to the NAND device 22 to which the data is written.

Then, the NAND control unit 12 receives a notification from the data transfer management unit 214 indicating the completion of the data transfer to the NAND device 22 to which the data is written. If data that is subsequently to be written is present in one of the NAND devices 22 in the same channel, the NAND control unit 12 issues a Write command to the NAND device 22 to which the subsequent data is written. In this way, the NAND control unit 12 repeatedly issues a Write command until the NAND device 22, to which data is subsequently written is not present in the same channel. Specifically, when data is written, the NAND control unit 12 sequentially issues a Write command to all of the NAND devices 22 that stores therein divided data obtained from the data that is specified to be written. For example, if a a single piece of data that is divided into pieces and then the pieces of data are stored in all of the NAND devices 22A to 22D in a distributed manner, the NAND control unit 12 sequentially issues a Write command to all of the NAND devices 22A to 22D.

After sending the Write command to all of the NAND devices 22, in which the divided data is stored, in the same channel, the NAND control unit 12 determines whether the NAND device 22 that has shifted from the Busy state to the Ready state is present. If the NAND device 22 that has shifted to the Ready state is present, the NAND control unit 12 determines whether a data transfer from the buffer 215 to the NAND device 22 has been completed. If the data transfer from the buffer 215 has been completed, the NAND control unit 12 transfers, to the buffer 215, data to be written and then issues a Write command to the NAND device 22 to which the data is written. Then, the NAND control unit 12 instructs the data transfer management unit 214 to start the data transfer from the buffer 215 to the NAND device 22 to which the data is written.

The NAND control unit 12 repeats the process described above until the writing of the data has been completed. Specifically, the NAND control unit 12 detects the NAND device 22 that has shifted to the Ready state. Then, the NAND control unit 12 transfers, to the buffer 215, the data to be written. Then, the NAND control unit 12 transfers the data from the buffer 215 to the page register 222 in the detected NAND device 22. The NAND control unit 12 repeats this process.

In the following, the NAND controller 21 will be described. As illustrated in FIG. 3, the NAND controller 21 includes a PCI express I/F 211, the command management unit 212, the state notifying unit 213, the data transfer management unit 214, the buffer 215, and a NAND I/F 216.

The PCI express I/F 211 is an interface that is used for communication with the NAND control unit 12. In practice, the command management unit 212, the state notifying unit 213, the data transfer management unit 214, and the buffer 215 described below communicate with the NAND control unit 12 via the PCI express I/F 211. However, in a description below, for convenience of description, a description will sometimes be given as if the command management unit 212, the state notifying unit 213, the data transfer management unit 214, and the buffer 215 directly communicate with the NAND control unit 12.

The NAND I/F 216 is an interface used for the NAND controller 21 to communicate with the NAND device 22. In practice, the command management unit 212, the state notifying unit 213, the data transfer management unit 214, and the buffer 215 communicate with the NAND device 22 via the NAND I/F 216. However, in a description below, for convenience of description, a description will sometimes be given as if the command management unit 212, the state notifying unit 213, the data transfer management unit 214, and the buffer 215 directly communicate with the NAND device 22.

When the command management unit 212 reads data, the command management unit 212 receives a Read command from the NAND control unit 12. Then, the command management unit 212 specifies the NAND device 22 that is specified by the Read command. Then, the command management unit 212 issues a Read command to the specified NAND device 22. After having issued the Read command, the command management unit 212 sends a notification to the NAND control unit 12 indicating that the Read command has been issued.

Furthermore, if data is to be written, the command management unit 212 receives a Write command from the NAND control unit 12. Then, the command management unit 212 specifies the NAND device 22 that is specified by the Write command. Thereafter, the command management unit 212 issues the Write command to the specified NAND device 22. After having issued the Write command, the command management unit 212 sends a notification to the NAND control unit 12 indicating that the Write command has been issued.

The state notifying unit 213 monitors whether the NAND device 22 is in the Busy state or the Ready state. Furthermore, the state notifying unit 213 periodically receives, from the NAND control unit 12, a state notification request for each of the NAND device 22. Then, the state notifying unit 213 notifies the NAND control unit 12 of the state of the NAND device 22 that is specified by the state notification request received from the NAND control unit 12.

In the first embodiment, in response to the polling of the state notification request received from the NAND control unit 12, the state notifying unit 213 notifies the NAND control unit 12 of the state of the specified NAND device 22. However, another method may also be used to notify the state. For example, the state notifying unit 213 may also interrupt the host 1 when the NAND device 22, which is monitored, shifts from the Busy state to the Ready state and then sends a notification indicating that the NAND device 22 becomes in the Ready state.

When data is read, the buffer 215 accumulates pieces of data until the size of data reaches the size for a data transfer to the host 1. Furthermore, when data is written, the buffer 215 temporarily stores the data sent from the host 1, i.e. stores the data until the data is transferred to the NAND device 22.

When data is read, the data transfer management unit 214 receives, from the NAND control unit 12, an instruction to start a data transfer from the NAND device 22 to the buffer 215. Then, the data transfer management unit 214 reads, from the page register 222 in the specified NAND device 22, the specified data and then transfers the data to the buffer 215. Then, when the data transfer to the buffer 215 has been completed, the data transfer management unit 214 notifies the NAND control unit 12 the completion of the data transfer.

Thereafter, the data transfer management unit 214 receives, from the NAND control unit 12, an instruction to perform a data transfer from the buffer 215 to the host 1. Then, the data transfer management unit 214 sends the data stored in the buffer 215 to the host 1.

When data is written, the data transfer management unit 214 stores, in the buffer 215, the data that is to be written and that is sent from the NAND control unit 12. Then, the data transfer management unit 214 receives, from the NAND control unit 12, an instruction to start a data transfer from the buffer 215 to the NAND device 22. Then, the data transfer management unit 214 reads the data from the buffer 215 and transfers the data to the page register 222 in the specified NAND device 22. When the data transfer to the NAND device 22 has been completed, the data transfer management unit 214 notifies the NAND control unit 12 the completion of the data transfer.

The NAND device 22 includes the memory cell 221 and the page register 222 (see FIG. 2). When the NAND device 22 receives a Read command from the command management unit 212, the NAND device 22 reads the data specified by the Read command from the memory cell 221 and then stores the read data in the page register 222. The NAND device 22 becomes in a Busy state during the time period for which the data that has been read from the memory cell 221 is stored in the page register 222.

Furthermore, when data is written, the NAND device 22 stores, in the page register 222, the data that has been read from the buffer 215 by the data transfer management unit 214. Thereafter, when the NAND device 22 receives a Write command from the command management unit 212, the NAND device 22 reads the data stored in the page register 222 and then stores the read data in the memory cell 221. The NAND device 22 becomes in a Busy state during the time period for which the data that has been read from the page register 222 is stored in the memory cell 221.

Figure 4:
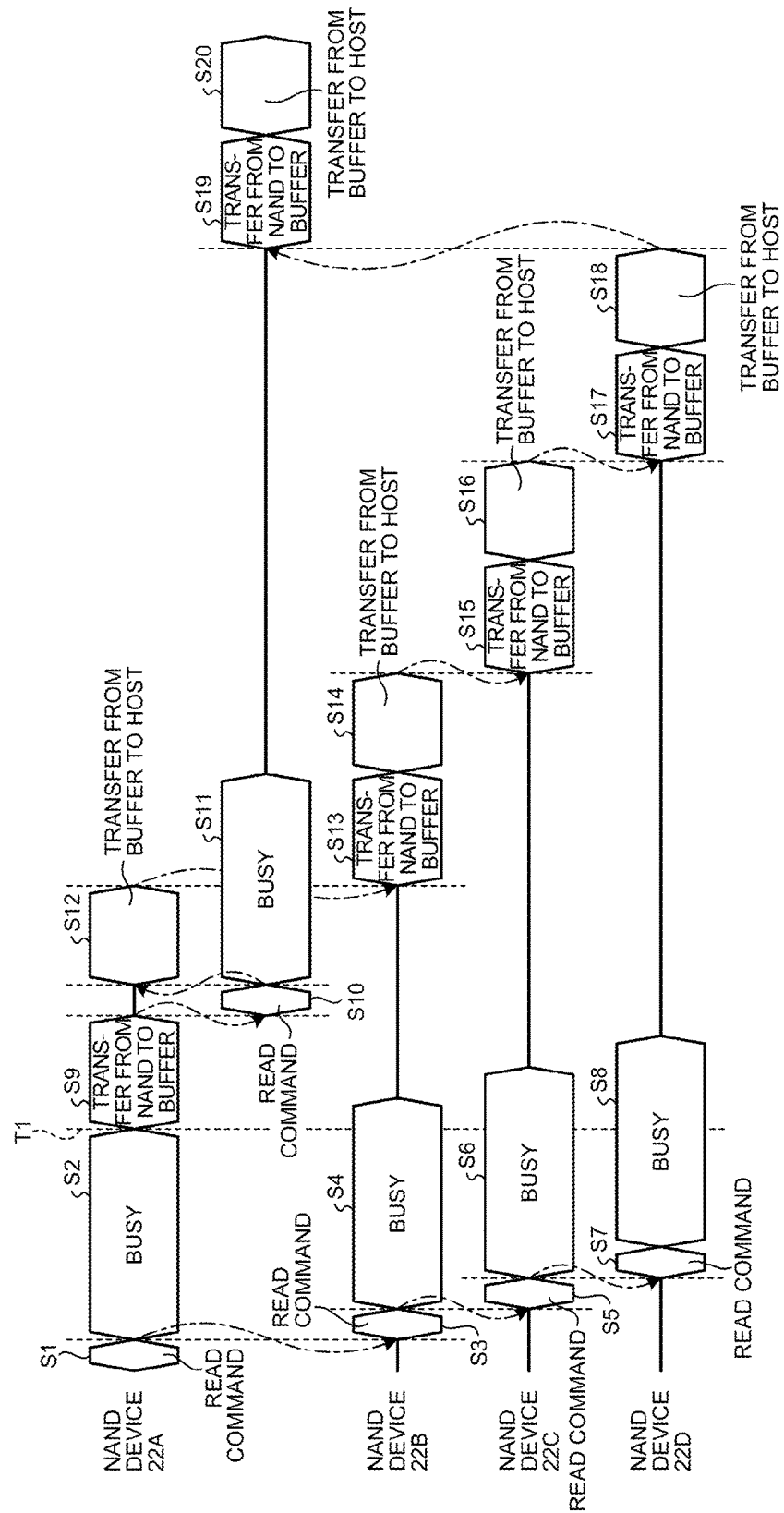
FIG. 4 is a time chart of a data read process performed by the storage system according to the first embodiment.

In the following, the overall flow of the data read process performed by the storage system according to the first embodiment will be described with reference to FIG. 4. FIG. 4 is a time chart of a data read process performed by the storage system according to the first embodiment. The processes illustrated in FIG. 4 are associated with the processes performed by the NAND devices 22A to 22D, which are illustrated on the left side in FIG. 4. Furthermore, the horizontal axis illustrated in FIG. 4 represents the time elapsed. In the first embodiment, a description will be given of a case in which data is read from the four NAND devices 22A to 22D in a single channel. Furthermore, in FIG. 4, the transition of the process is sometimes indicated by the dashed line arrow in order to easy to understand the transition of the process.

The command management unit 212 receives a Read command for the NAND device 22A from the NAND control unit 12. Then, the command management unit 212 issues the Read command to the NAND device 22A (Step S1). The command management unit 212 sends a notification to the NAND control unit 12 indicating that the Read command has been issued.

When the NAND device 22A receives the issued Read command, the NAND device 22A transfers the specified data from a cell to the page register 222. The NAND device 22A becomes in the Busy state during this time period (Step S2).

Furthermore, at the same time as the NAND device 22A is being in the Busy state, the command management unit 212 receives a Read command for the NAND device 22B from the NAND control unit 12. Then, the command management unit 212 issues the Read command to the NAND device 22B (Step S3). The command management unit 212 sends a notification to the NAND control unit 12 indicating that the Read command has been issued.

When the NAND device 22B receives the issued Read command, the NAND device 22B transfers the specified data from a cell to the page register 222. The NAND device 22B becomes in the Busy state during this time period (Step S4).

Furthermore, at the same time as the NAND device 22B is being in the Busy state, the command management unit 212 receives a Read command for the NAND device 22C from the NAND control unit 12. Then, the command management unit 212 issues the Read command to the NAND device 22C (Step S5). The command management unit 212 sends a notification to the NAND control unit 12 indicating that the Read command has been issued.

When the NAND device 22C receives the Read command, the NAND device 22C transfers the specified data from a cell to the page register 222. The NAND device 22C becomes in the Busy state during this time period (Step S6).

Furthermore, at the same time as the NAND device 22C is being in the Busy state, the command management unit 212 receives a Read command for the NAND device 22D from the NAND control unit 12. Then, the command management unit 212 issues the Read command to the NAND device 22D (Step S7). The command management unit 212 sends a notification to the NAND control unit 12 indicating that the Read command has been issued.

When the NAND device 22D receives the Read command, the NAND device 22D transfers the specified data from a cell to the page register 222. The NAND device 22D becomes in the Busy state during this time period (Step S8).

After the processes at Steps S2, S4, S6, and S8 end, the NAND devices 22A to 22D shift from the Busy state to the Ready state, respectively. When the processes at Steps S2, S4, S6, and S8 end, the state notifying unit 213 notifies the NAND control unit 12 that each of the NAND devices 22A to 22D has shifted from the Busy state to the Ready state. In FIG. 4, the NAND device 22A shifts from the Busy state to the Ready state first. At this point, the data transfer management unit 214 receives, from the NAND control unit 12, an instruction to start a transfer of data from the page register 222 in the NAND device 22A to the buffer 215. Then, the data transfer management unit 214 transfers data from the page register 222 in the NAND device 22A to the buffer 215 (Step S9). However, in FIG. 4, this state is represented by, for convenience of description, a "transfer from a NAND to the buffer". Then, when the data transfer has been completed, i.e., when the process at Step S9 has been completed, the data transfer management unit 214 notifies the NAND control unit 12 of the completion of the data transfer.

Subsequently, the command management unit 212 receives a Read command for the NAND device 22A from the NAND control unit 12. Then, the command management unit 212 issues the Read command to the NAND device 22A (Step S10). The command management unit 212 sends a notification to the NAND control unit 12 indicating that the Read command has been issued.

When the NAND device 22A receives the issued Read command, the NAND device 22A transfers the specified data from a cell to the page register 222. The NAND device 22A becomes in the Busy state during this time period (Step S11). Thereafter, when the process at Step S11 has been completed, the state notifying unit 213 notifies the NAND control unit 12 that the NAND device 22A has shifted to the Ready state.

In contrast, after the Read command has been issued, the data transfer management unit 214 receives, from the NAND control unit 12, an instruction to send the data stored in the buffer 215 to the host 1. Then, at the same time as the NAND device 22A is being in the Busy state, the data transfer management unit 214 transfers the data from the buffer 215 to the host 1 (Step S12).

When the data transfer from the buffer 215 to the host 1 has been completed, i.e., when the process at Step S12 has ended, the data transfer management unit 214 receives, from the NAND control unit 12, an instruction to start a transfer of data from the NAND device 22B that is in the Ready state to the buffer 215. The data transfer from the NAND device 22B mentioned here specifically means the data transfer from the page register 222 in the NAND device 22B. Then, the data transfer management unit 214 transfers the data from the page register 222 in the NAND device 22B to the buffer 215 (Step S13). When the data transfer has been completed, i.e., when the process at Step S13 has been completed, the data transfer management unit 214 notifies the NAND control unit 12 of the completion of the data transfer. A description will be given here with the assumption that data to be read is not present any more.

Then, the data transfer management unit 214 receives, from the NAND control unit 12, an instruction to send the data stored in the buffer 215 to the host 1. Then, the data transfer management unit 214 transfers the data from the buffer 215 to the host 1 (Step S14).

When the data transfer from the buffer 215 to the host 1 has been completed, i.e., when the process at Step S14 has ended, the data transfer management unit 214 receives, from the NAND control unit 12, an instruction to start a transfer of data from the NAND device 22C that is in the Ready state to the buffer 215. The data transfer from the NAND device 22C mentioned here specifically means the data transfer from the page register 222 in the NAND device 22C. Then, the data transfer management unit 214 transfers the data from the page register 222 in the NAND device 22C to the buffer 215 (Step S15). When the data transfer has been completed, i.e., when the process at Step S15 has been completed, the data transfer management unit 214 notifies the NAND control unit 12 of the completion of the data transfer.

Then, the data transfer management unit 214 receives, from the NAND control unit 12, an instruction to send the data stored in the buffer 215 to the host 1. Then, the data transfer management unit 214 transfers the data from the buffer 215 to the host 1 (Step S16).

When the data transfer from the buffer 215 to the host 1 has been completed, i.e., when the process Step S16 has ended, the data transfer management unit 214 receives, from the NAND control unit 12, an instruction to start a transfer of data from the NAND device 22D that is in the Ready state to the buffer 215. The data transfer from the NAND device 22D mentioned here specifically means the data transferred from the page register 222 in the NAND device 22D. Then, the data transfer management unit 214 transfers the data from the page register 222 in the NAND device 22D to the buffer 215 (Step S17). When the data transfer has been completed, i.e., when the process at Step S17 has been completed, the data transfer management unit 214 notifies the NAND control unit 12 of the completion of the data transfer.

Then, the data transfer management unit 214 receives, from the NAND control unit 12, an instruction to send the data stored in the buffer 215 to the host 1. Then, the data transfer management unit 214 transfers the data from the buffer 215 to the host 1 (Step S18).

Furthermore, when the data transfer from the buffer 215 to the host 1 has been completed, i.e., when the process at Step S18 has ended, the data transfer management unit 214 receives, from the NAND control unit 12, an instruction to start a transfer of data from the NAND device 22A that is in the Ready state to the buffer 215. The data transfer from the NAND device 22A mentioned here specifically means the data transfer from the page register 222 in the NAND device 22A. Then, the data transfer management unit 214 transfers the data from the page register 222 in the NAND device 22A to the buffer 215 (Step S19). When the data transfer has been completed, i.e., when the process at Step S19 has been completed, the data transfer management unit 214 notifies the NAND control unit 12 of the completion of the data transfer.

Then, the data transfer management unit 214 receives, from the NAND control unit 12, an instruction to send the data stored in the buffer 215 to the host 1. Then, the data transfer management unit 214 transfers the data from the buffer 215 to the host 1 (Step S20).

At this point, after the timing T1 illustrated in FIG. 4, the time period of the Busy state overlaps with the time period for which another process is being executed. Consequently, after the timing T1, the use efficiency of the buses 23 is improved when compared with the conventional technology.

Figure 5:
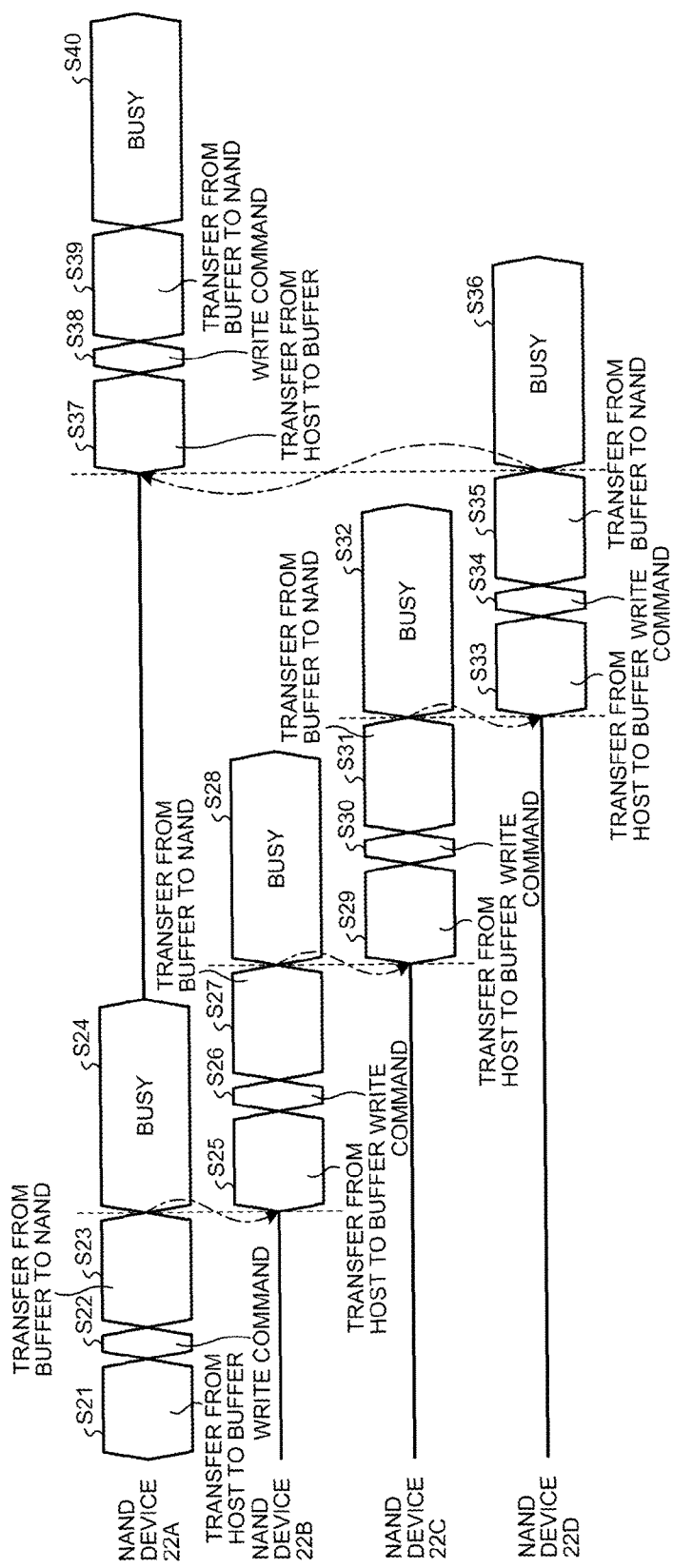
FIG. 5 is a time chart of a data write process performed by the storage system according to the first embodiment.

In the following, the overall flow of the data write process performed by the storage system according to the first embodiment will be described with reference to FIG. 5. FIG. 5 is a time chart of a data write process performed by the storage system according to the first embodiment. The processes illustrated in FIG. 5 are associated with the processes executed by the NAND devices 22A to 22D, which are illustrated on the left side in FIG. 5. Furthermore, the horizontal axis illustrated in FIG. 5 represents the time elapsed. In the first embodiment, a description will be given of a case in which data is written to the four NAND devices 22A to 22D in a single channel. Furthermore, in FIG. 5, the transition of the process is sometimes indicated by the dashed line arrow in order to easy to understand the transition of the process.

The data transfer management unit 214 transfers, to the buffer 215, the data sent from the host 1 (Step S21).

Then, the command management unit 212 receives a Write command for the NAND device 22A from the NAND control unit 12. Then, the command management unit 212 issues the Write command to the NAND device 22A (Step S22). The command management unit 212 sends a notification to the NAND control unit 12 indicating that the Write command has been issued.

Thereafter, the data transfer management unit 214 receives, from the NAND control unit 12, an instruction to perform a data transfer from the buffer 215 to the NAND device 22A. Then, the data transfer management unit 214 transfers the data from the buffer 215 to the page register 222 in the NAND device 22A (Step S23). When the data has been transferred from the buffer 215 to the NAND device 22A, the data transfer management unit 214 notifies the NAND control unit 12 of the completion of the data transfer.

The NAND device 22A transfers the data stored in the page register 222 to the memory cell 221. The NAND device 22A becomes in the Busy state during this time period (Step S24). Thereafter, when the process at Step S24 has been completed, the state notifying unit 213 notifies the NAND control unit 12 that the NAND device 22A has shifted to the Ready state.

In contrast, at the same time as the NAND device 22A is being in the Busy state, the data transfer management unit 214 transfers the data sent from the host 1 to the buffer 215 (Step S25).

Then, the command management unit 212 receives a Write command for the NAND device 22B from the NAND control unit 12. Then, the command management unit 212 issues the Write command to the NAND device 22B (Step S26). The command management unit 212 sends a notification to the NAND control unit 12 indicating that the Write command has been issued.

Thereafter, the data transfer management unit 214 receives, from the NAND control unit 12, an instruction to perform a data transfer from the buffer 215 to the NAND device 22B. Then, the data transfer management unit 214 transfers data from the buffer 215 to the page register 222 in the NAND device 22B (Step S27). When the data has been transferred from the buffer 215 to the NAND device 22B, the data transfer management unit 214 notifies the NAND control unit 12 of the completion of the data transfer.

The NAND device 22B transfers the data stored in the page register 222 to the memory cell 221. The NAND device 22B becomes in the Busy state during this time period (Step S28). Thereafter, when the process at Step S28 has been completed, the state notifying unit 213 notifies the NAND control unit 12 that the NAND device 22B has shifted to the Ready state.

In contrast, at the same time as the NAND device 22B is being in the Busy state, the data transfer management unit 214 transfers, to the buffer 215, the data sent from the host 1 (Step S29).

Thereafter, the command management unit 212 receives a Write command for the NAND device 22C from the NAND control unit 12. Then, the command management unit 212 issues the Write command to the NAND device 22C (Step S30). Then, the command management unit 212 sends a notification to the NAND control unit 12 indicating that the Write command has been issued.

Then, the data transfer management unit 214 receives, from the NAND control unit 12, an instruction to perform a data transfer from the buffer 215 to the NAND device 22C. Then, the data transfer management unit 214 transfers the data from the buffer 215 to the page register 222 in the NAND device 22C (Step S31). When the data has been transferred from the buffer 215 to the NAND device 22C, the data transfer management unit 214 notifies the NAND control unit 12 of the completion of the data transfer.

The NAND device 22C transfers the data stored in the page register 222 to the memory cell 221. The NAND device 22C becomes in the Busy state during this time period (Step S32). Thereafter, when the process at Step S32 has been ended, the state notifying unit 213 notifies the NAND control unit 12 that the NAND device 22C has shifted to the Ready state.

In contrast, at the same time as the NAND device 22C is being in the Busy state, the data transfer management unit 214 transfers, to the buffer 215, the data sent from the host 1 (Step S33).

Then, the command management unit 212 receives a Write command for the NAND device 22D from the NAND control unit 12. Then, the command management unit 212 issues the Write command to the NAND device 22D (Step S34). The command management unit 212 sends a notification to the NAND control unit 12 indicating that the Write command has been issued.

Thereafter, the data transfer management unit 214 receives, from the NAND control unit 12, an instruction to perform a data transfer from the buffer 215 to the NAND device 22D. Then, the data transfer management unit 214 transfers data from the buffer 215 to the page register 222 in the NAND device 22D (Step S35). When the data has been transferred from the buffer 215 to the NAND device 22D, the data transfer management unit 214 notifies the NAND control unit 12 of the completion of the data transfer.

The NAND device 22D transfers the data stored in the page register 222 to the memory cell 221. The NAND device 22D becomes in the Busy state during this time period (Step S36). Thereafter, when the process at Step S36 has been ended, the state notifying unit 213 notifies the NAND control unit 12 that the NAND device 22D has shifted to the Ready state.

In contrast, at the same time as the NAND device 22D is being in the Busy state, the data transfer management unit 214 transfers, to the buffer 215, the data sent from the host 1 (Step S37).

Then, the command management unit 212 receives a Write command for the NAND device 22A from the NAND control unit 12. Then, the command management unit 212 issues the Write command to the NAND device 22A (Step S38). The command management unit 212 sends a notification to the NAND control unit 12 indicating that the Write command has been issued.

Thereafter, the data transfer management unit 214 receives, from the NAND control unit 12, an instruction to perform a data transfer from the buffer 215 to the NAND device 22A. Then, the data transfer management unit 214 transfers data from the buffer 215 to the page register 222 in the NAND device 22A (Step S39). When the data has been transferred from the buffer 215 to the NAND device 22A, the data transfer management unit 214 notifies the NAND control unit 12 of the completion of the data transfer.

The NAND device 22A transfers the data stored in the page register 222 to a cell. The NAND device 22A becomes in the Busy state during this time period (Step S40). Thereafter, when the process at Step S40 has ended, the state notifying unit 213 notifies the NAND control unit 12 that the NAND device 22A has shifted to the Ready state.

Figure 6:
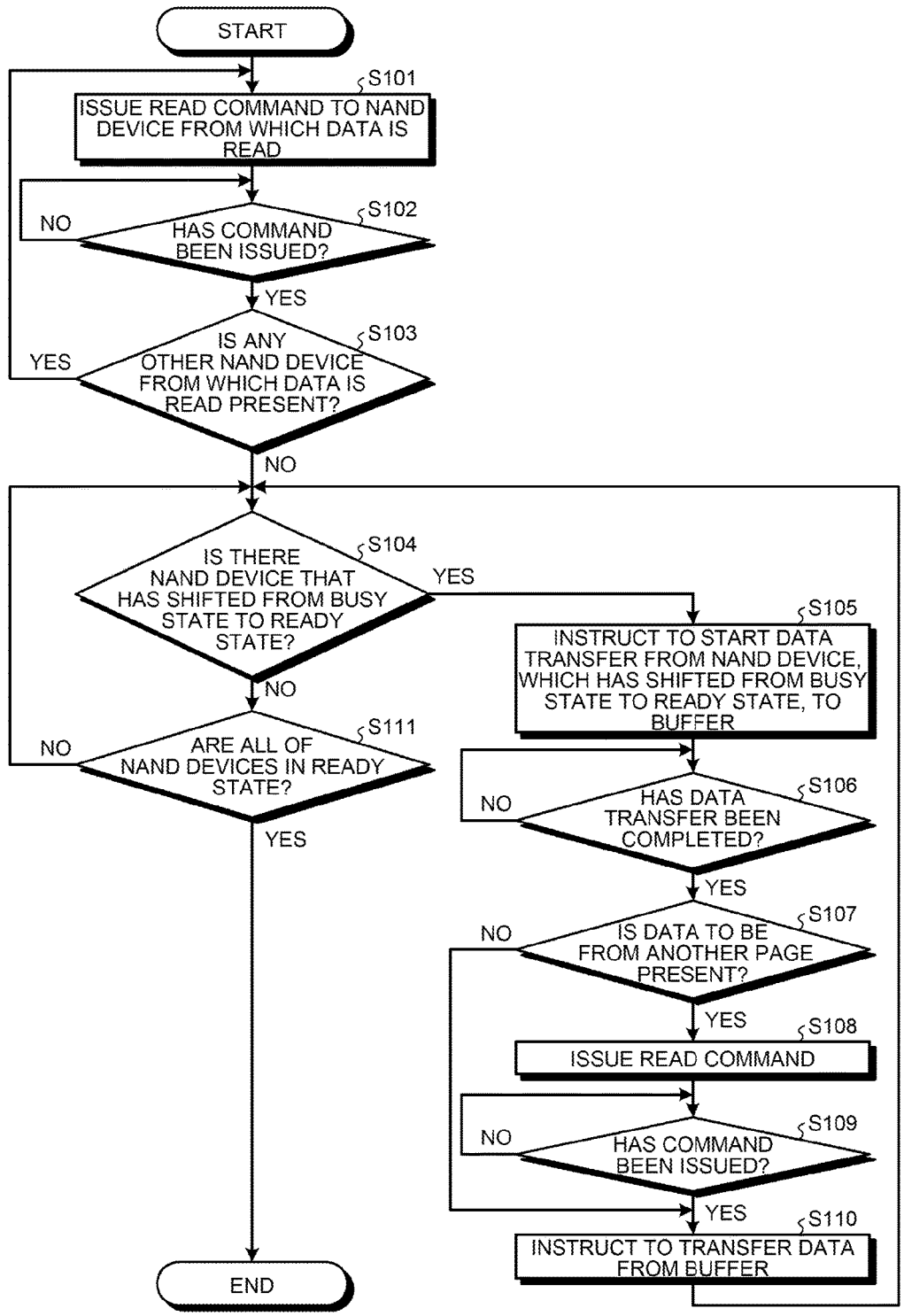
FIG. 6 is a flowchart illustrating the flow of a process performed by a NAND control unit according to the first embodiment when data is read.

In the following, a process performed by the NAND control unit 12 according to the first embodiment when data is read will be described with reference to FIG. 6. FIG. 6 is a flowchart illustrating the flow of a process performed by a NAND control unit according to the first embodiment when data is read.

The NAND control unit 12 issues a Read command to the NAND device 22 from which data is read (Step S101).

Then, on the basis of whether a notification has been received from the command management unit 212 indicating that the command has been issued, the NAND control unit 12 determines whether the command has been issued (Step S102). If the command has not been issued (No at Step S102), the NAND control unit 12 waits until the command is issued.

In contrast, if the command has been issued (Yes at Step S102), the NAND control unit 12 determines whether any other NAND device 22 from which data is read is present (Step S103). If any other NAND device 22 from which data is read is present (Yes at Step S103), the NAND control unit 12 returns to Step S101.

In contrast, no other NAND device 22 from which data is read is present (No at Step S103), the NAND control unit 12 determines whether the NAND device 22 that has shifted from the Busy state to the Ready state is present (Step S104).

If the NAND device 22 that has shifted from the Busy state to the Ready state is present (Yes at Step S104), the NAND control unit 12 instructs the data transfer management unit 214 to start a data transfer from the NAND device 22, which has shifted from the Busy state to the Ready state, to the buffer 215 (Step S105).

On the basis of whether a notification of the completion of the data transfer has been received from the data transfer management unit 214, the NAND control unit 12 determines whether the data transfer has been completed (Step S106). If the data transfer has not been completed (No at Step S106), the NAND control unit 12 waits until the data transfer has been completed.

In contrast, if the data transfer has been completed (Yes at Step S106), the NAND control unit 12 determines whether data to be read from another page in the NAND device 22 that has performed the data transfer is present (Step S107). If data to be read from another page is not present (No at Step S107), the NAND control unit 12 proceeds to Step S110.

In contrast, if data to be read from another page is present (Yes at Step S107), the NAND control unit 12 issues a Read command to the NAND device 22 that has performed the data transfer (Step S108).

Then, on the basis of whether a notification has been received from the command management unit 212 indicating that the command has been issued, the NAND control unit 12 determines whether the command has been issued (Step S109). If the command has not been issued (No at Step S109), the NAND control unit 12 waits until the command is issued.

In contrast, if the command has been issued (Yes at Step S109), the NAND control unit 12 instructs the data transfer management unit 214 to perform a data transfer from the buffer 215 to the host 1 (Step S110). Then, the NAND control unit 12 returns to Step S104.

In contrast, if the NAND device 22 that has shifted from the Busy state to the Ready state is not present (No at Step S104), the NAND control unit 12 determines whether all of the NAND devices 22 that stores therein data to be read is in the Ready state (Step S111).

If not all of the NAND devices 22 that stores therein data to be read is in the Ready state (No at Step S111), the NAND control unit 12 returns to Step S104.

In contrast, all of the NAND devices 22 that stores therein data to be read is in the Ready state (Yes at Step S111), the NAND control unit 12 ends the data read process.

Figure 7:
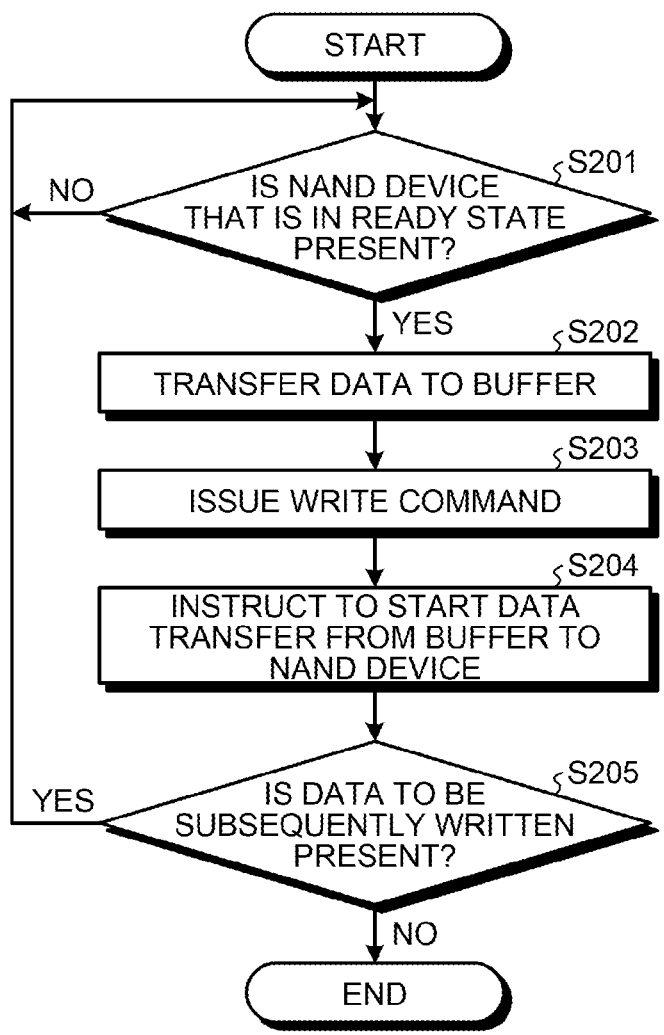
FIG. 7 is a flowchart illustrating the flow of a process performed by the NAND control unit according to the first embodiment when data is written.

In the following, a process performed by the NAND control unit 12 according to the first embodiment when data is written will be described with reference to FIG. 7. FIG. 7 is a flowchart illustrating the flow of a process performed by the NAND control unit according to the first embodiment when data is written.

In response to the notification received from the state notifying unit 213, the NAND control unit 12 determines whether the NAND device 22 that is in the Ready state is present (Step S201). If the NAND device 22 that is in the Ready state is not present (No at Step S201), the NAND control unit 12 waits until one of the NAND devices 22 becomes in the Ready state.

In contrast, if the NAND device 22 that is in the Ready state is present (Yes at Step S201), the NAND control unit 12 transfers, to the buffer 215, the data to be written (Step S202).

Then, the NAND control unit 12 issues a Write command to the NAND device 22 to which the data is to be written (Step S203).

Then, the NAND control unit 12 instructs the data transfer management unit 214 to start a data transfer from the buffer 215 to the NAND device 22 to which the data is to be written (Step S204).

Thereafter, the NAND control unit 12 determines whether data to be subsequently written is present (Step S205). If data to be subsequently written is present (Yes at Step S205), the NAND control unit 12 returns to Step S201. In contrast, if no data to be subsequently written is present (No at Step S205), the NAND control unit 12 ends the data write process.

Figure 8:
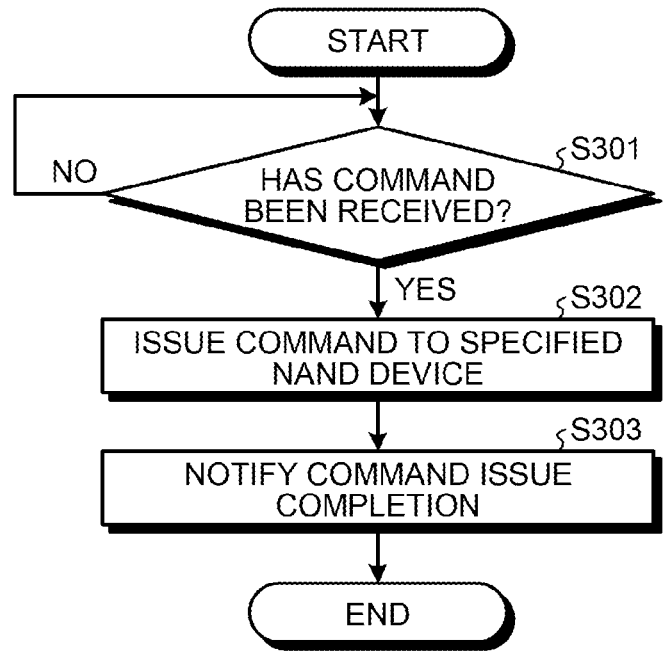
FIG. 8 is a flowchart illustrating the flow of a process performed by a command management unit according to the first embodiment when data is written and read.

In the following, a process performed by the command management unit 212 according to the first embodiment when data is written and read will be described with reference to FIG. 8. FIG. 8 is a flowchart illustrating the flow of a process performed by a command management unit according to the first embodiment when data is written and read.

The command management unit 212 determines whether a Read command or a Write command has been received (Step S301). If no command has been received (No at Step S301), the command management unit 212 waits until a command is received.

In contrast, if a command has been received (Yes at Step S301), the command management unit 212 issues the command to the NAND device 22 that has been specified by the received command (Step S302).

After the command management unit 212 has issued the command, the command management unit 212 notifies the NAND control unit 12 that the command has been issued (Step S303).

Figure 9:
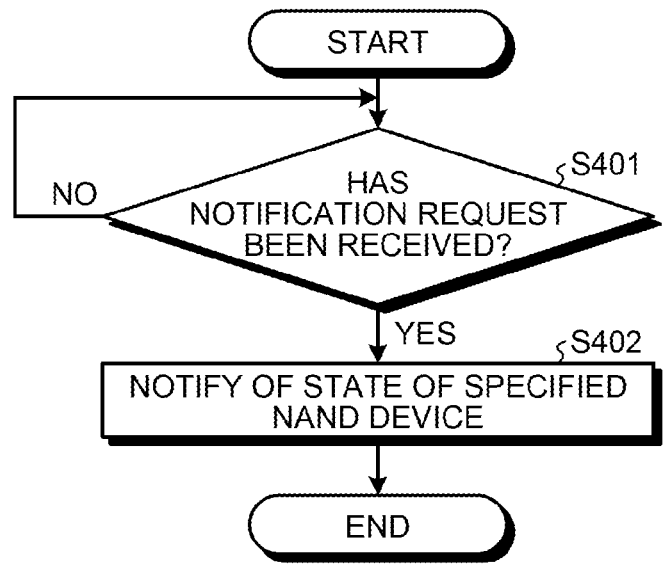
FIG. 9 is a flowchart illustrating the flow of a state notifying process performed by a state notifying unit according to the first embodiment.

In the following, a state notifying process performed by the state notifying unit 213 according to the first embodiment will be described with reference to FIG. 9. FIG. 9 is a flowchart illustrating the flow of a state notifying process performed by a state notifying unit according to the first embodiment.

The state notifying unit 213 determines whether a notification request for the state of the NAND device 22 has been received from the NAND control unit 12 (Step S401). The NAND control unit 12 executes, on the state notifying unit 213, the polling about a notification request for the state of each of the NAND devices 22. If no notification request for the state of each of the NAND devices 22 has been received (No at Step S401), the state notifying unit 213 waits until a notification request for the state of each of the NAND devices 22 is received.

In contrast, if a notification request for the state of each of the NAND devices 22 has been received (Yes at Step S401), the state notifying unit 213 notifies the NAND control unit 12 of the state of the NAND device 22 that is specified by the state notification request (Step S402).

Figure 10:
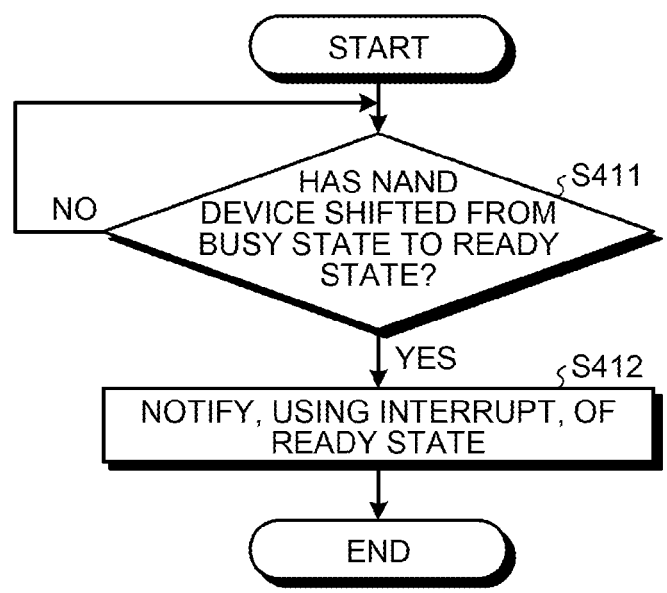
FIG. 10 is a flowchart illustrating the flow of the state notifying process performed by the state notifying unit when an interrupt is performed.

Furthermore, as described above, the state notifying unit 213 may also notify the state by performing an interrupt on the NAND control unit 12. Accordingly, in the following, a state notifying process performed when an interrupt is performed will be described with reference to FIG. 10. FIG. 10 is a flowchart illustrating the flow of the state notifying process performed by the state notifying unit when an interrupt is performed.

The state notifying unit 213 determines whether each of the NAND devices 22 has shifted from the Busy state to the Ready state (Step S411). If each of the NAND devices 22 has not shifted from the Busy state to the Ready state (No at Step S411), the state notifying unit 213 waits until one of the NAND devices 22 shifts from the Busy state to the Ready state.

In contrast, if one of the NAND devices 22 shifts from the Busy state to the Ready state (Yes at Step S411), the state notifying unit 213 performs an interrupt on the NAND control unit 12 and then notifies the NAND control unit 12 that the NAND device 22 that has shifted from the Busy state to the Ready state becomes in the Ready state (Step S412).

Figure 11:
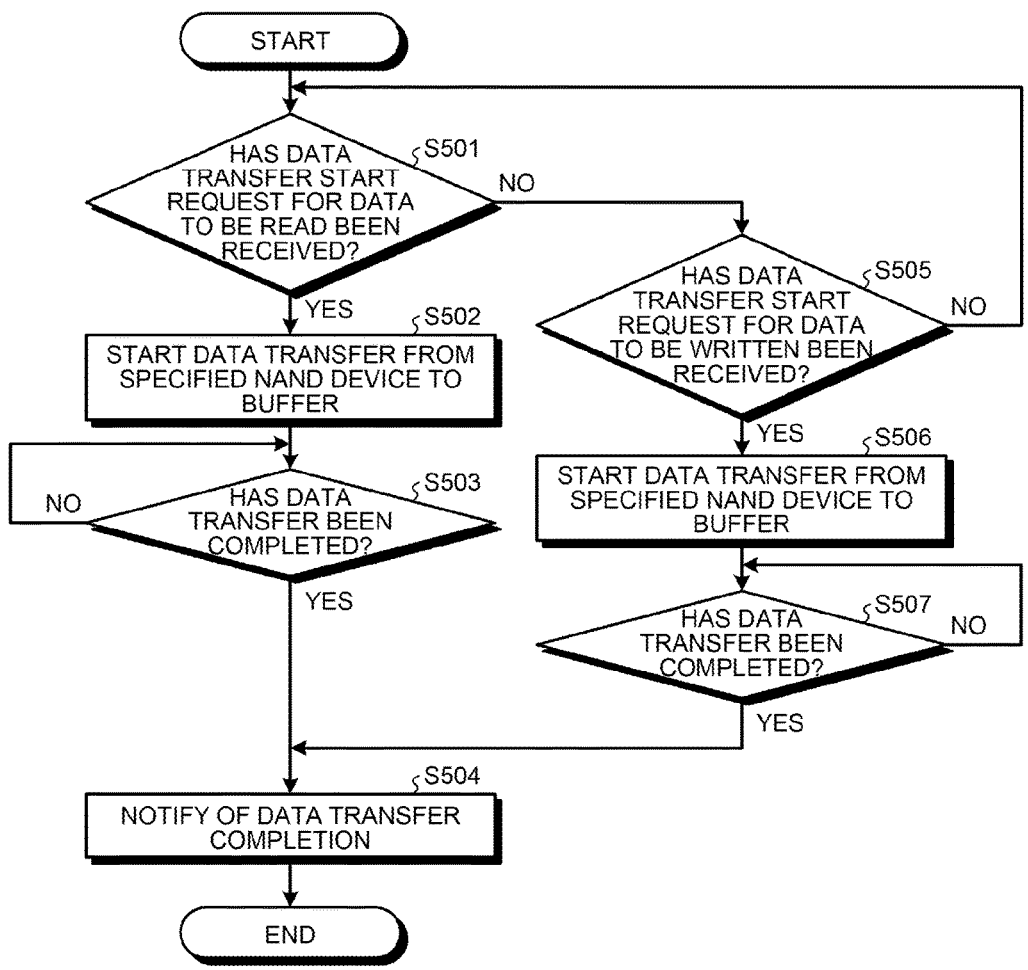
FIG. 11 is a flowchart illustrating the flow of a data transfer process performed by a data transfer management unit according to the first embodiment.

In the following, the data transfer process performed by the data transfer management unit 214 according to the first embodiment will be described with reference to FIG. 11. FIG. 11 is a flowchart illustrating the flow of a data transfer process performed by a data transfer management unit according to the first embodiment.

The data transfer management unit 214 determines whether a data transfer start request for data to be read is received from the NAND control unit 12 (Step S501).

If a data transfer start request for data to be read has been received (Yes at Step S501), the data transfer management unit 214 starts a data transfer from the NAND device 22, which is specified by the data transfer start request, to the buffer 215 (Step S502).

Then, the data transfer management unit 214 determines whether the data transfer from the NAND device 22 to the buffer 215 has been completed (Step S503). If the data transfer has not been completed (No at Step S503), the data transfer management unit 214 waits until the data transfer is completed.

In contrast, if the data transfer has been completed (Yes at Step S503), the data transfer management unit 214 notifies the NAND control unit 12 of the completion of the data transfer (Step S504).

In contrast, if a data transfer start request for data to be read has not been received (No at Step S501), the data transfer management unit 214 determines whether a data transfer start request for data to be written has been received from the NAND control unit 12 (Step S505). If the data transfer start request for data to be written has not been received from the NAND control unit 12 (No at Step S505), the data transfer management unit 214 returns to Step S501.

In contrast, if the data transfer start request for data to be written has not been received (Yes at Step S505), the data transfer management unit 214 starts a data transfer from the buffer 215 to the NAND device 22 that has been specified by the data transfer start request (Step S506).

Then, the data transfer management unit 214 determines whether the data transfer from the buffer 215 to the NAND device 22 has been completed (Step S507). If the data transfer has not been completed (No at Step S507), the data transfer management unit 214 waits until the data transfer is completed.

In contrast, if the data transfer has been completed (Yes at Step S507), the data transfer management unit 214 notifies the NAND control unit 12 of the completion of the data transfer (Step S504).

As described above, with the storage system according to the first embodiment, the host controls the timing at which executing a command for a NAND device is started and a data transfer is started. Then, when the NAND device is in the Busy state, the storage system executes another process by overlapping the time period for which another process is executed with the time period of the Busy state without waiting for the NAND device becoming in the Ready state. Consequently, it is possible to improve the use efficiency of the bus between a buffer of a NAND controller and a NAND device and between the buffer of the NAND controller and the host and thus it is possible to speed up the data transfer rate.

Furthermore, with the storage system according to the first embodiment, the host controls the reading and the writing of data in a NAND device. Consequently, on the basis of the result of determination whether an application running on the host has a data pattern that can be allocated, in a distributed manner, to multiple NAND devices, data is written or read by overlapping processes. Consequently, data can be written or read by appropriately overlapping processes and thus it is possible to reliably improve the use efficiency of the bus.

[b] Second Embodiment

Figure 12:
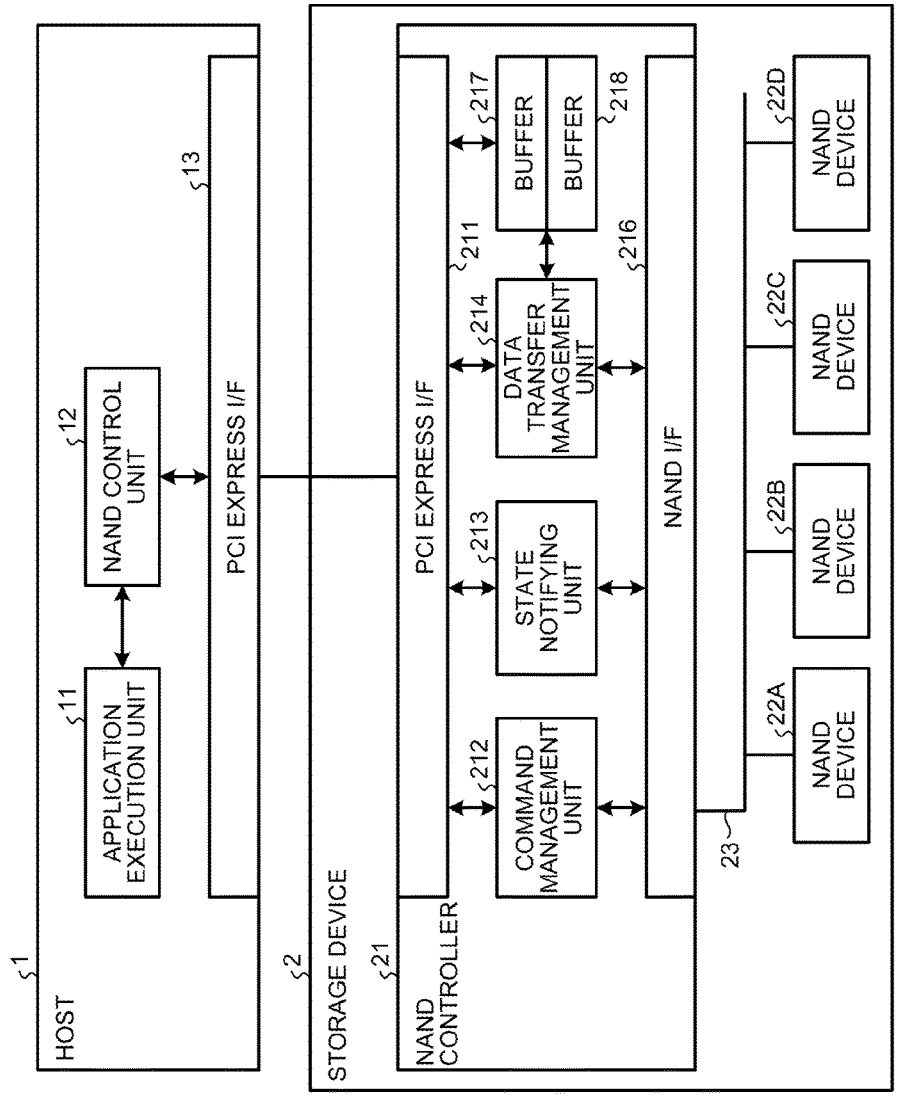
FIG. 12 is a block diagram illustrating a storage system according to a second embodiment.

FIG. 12 is a block diagram illustrating a storage system according to a second embodiment. A storage system according to a second embodiment differs from the first embodiment in that a double buffer is used as a buffer of a NAND controller. In a description below, components having the same function as that performed in the first embodiment will not be described.

When data is read, if there is the NAND device 22 that has shifted from the Busy state to the Ready state after a Read command has been issued, the NAND control unit 12 determines whether data is present in a buffer 217 or 218. At this point, when the NAND control unit 12 sends an instruction to start a data transfer to the buffer 217 or 218, the NAND control unit 12 stores therein which buffer has received the transferred data. Then, the NAND control unit 12 determines, by using the stored information, whether data is present in the buffers.

If no data is present in the buffers 217 and 218, the NAND control unit 12 selects one of the buffers. In the second embodiment, it is assumed that, if no data is present in the buffers 217 and 218, the NAND control unit 12 selects the buffer 217.

Then, the NAND control unit 12 instructs the data transfer management unit 214 to start a data transfer from the NAND device 22 that has shifted to the Ready state to the selected buffer.

If data is present in the buffer 217, the NAND control unit 12 instructs the data transfer management unit 214 to start a data transfer from the NAND device 22 that has shifted to the Ready state to the buffer 218.

Furthermore, the NAND control unit 12 instructs, at the same time as a data transfer to the buffer 218 is being performed, the data transfer management unit 214 instructs to perform a data transfer from the buffer 217 to the host.

If data is present in the buffer 218, the NAND control unit 12 instructs the data transfer management unit 214 to start a data transfer from the NAND device 22 that has shifted to the Ready state to the buffer 217.

Furthermore, the NAND control unit 12 instructs, at the same time as a data transfer to the buffer 217 is being performed, the data transfer management unit 214 instructs a data transfer from the buffer 218 to the host.

If data is present in both the buffers 217 and 218 or if data is present in one of the buffers 217 and 218, the NAND control unit 12 performs the following operation. Namely, when the NAND control unit 12 receives, from the data transfer management unit 214, a notification of the completion of the data transfer, the NAND control unit 12 determines whether there is data to be read from another page in the NAND device 22 that has performed the data transfer. If data is read from another page, the NAND control unit 12 issues a Read command to that NAND device 22.

In the following, a description will be given of a case in which data is written. When the NAND control unit 12 has issued a Write command, the NAND control unit 12 determines whether the NAND device 22 that has shifted from the Busy state to the Ready state is present. If the NAND device 22 that has shifted from the Busy state to the Ready state is present, the NAND control unit 12 determines whether data is present in the buffer 217 or 218.

If data is present in the buffer 217, the NAND control unit 12 instructs the data transfer management unit 214 to perform a data transfer from the buffer 217 to the NAND device 22 and to start a data transfer from the host 1 to the buffer 218.

If data is present in the buffer 218, the NAND control unit 12 instructs the data transfer management unit 214 to perform a data transfer from the buffer 218 to the NAND device 22 and to start a data transfer from the host 1 to the buffer 217.

If data is present in both the buffers 217 and 218, the NAND control unit 12 instructs the data transfer management unit 214 a data transfer from one of the buffers to the NAND device 22.

If data is present in both the buffers 217 and 218 or if data is present in one of the buffers 217 and 218, the NAND control unit 12 performs the following operation. Namely, when the NAND control unit 12 receives a notification from the data transfer management unit 214 indicating that the data transfer has been completed, the NAND control unit 12 issues a Write command to the NAND device 22 for the one of the buffers 217 or 218 that stores therein data to be read. Then, after the Write command has been issued, the NAND control unit 12 repeats the process that determines whether the NAND device 22 that has shifted from the Busy state to the Ready state is present and the subsequent processes.

As in the second embodiment, when a double buffer is used, it is possible to perform, while a data transfer is being performed between the host 1 and one of the buffers, a data transfer between the NAND device 22 and the other one of the buffer. Consequently, by using the NAND controller 21 as a boundary, each of the data transfers can be separately performed and furthermore the data transfers can be overlapped with each other; therefore, the use efficiency of a bus can be further improved.

Figure 13:
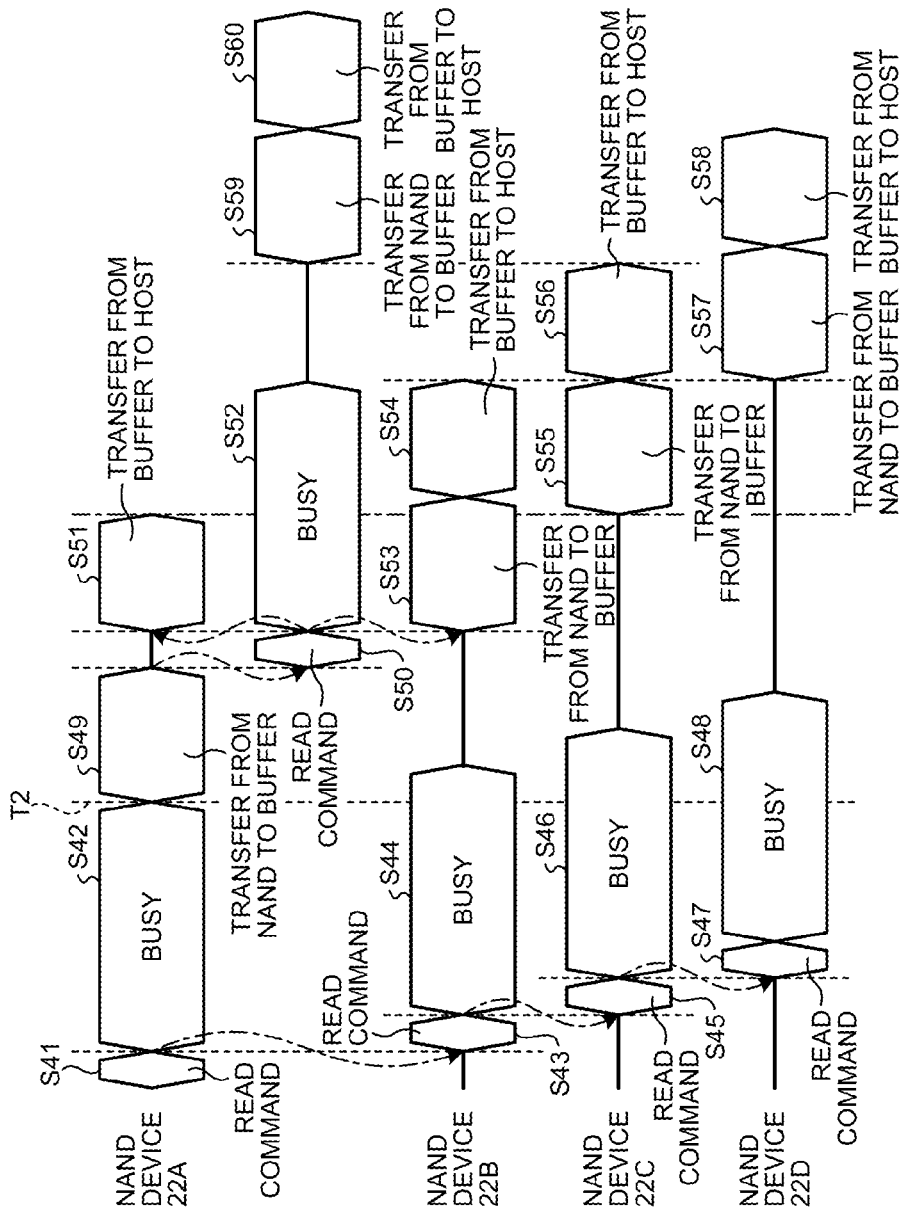
FIG. 13 is a time chart of a data read process performed by the storage system according to the second embodiment.

In the following, the overall flow of the data read process performed by the storage system according to the second embodiment will be described with reference to FIG. 13. FIG. 13 is a time chart of a data read process performed by the storage system according to the second embodiment. The processes illustrated in FIG. 13 are associated with the processes performed by the NAND devices 22A to 22D, which are illustrated on the left side in FIG. 13. Furthermore, the horizontal axis illustrated in FIG. 13 represents the time elapsed. In the second embodiment, a description will be given of a case in which data is read from the four NAND devices 22A to 22D in a single channel. Furthermore, in FIG. 13, the transition of the process is sometimes indicated by the dashed line arrow in order to easy to understand the transition of the process.

The command management unit 212 receives a Read command for the NAND device 22A from the NAND control unit 12. Then, the command management unit 212 issues the Read command to the NAND device 22A (Step S41). The command management unit 212 sends a notification to the NAND control unit 12 indicating the completion of the Read command.

When the NAND device 22A receives the issued Read command, the NAND device 22A transfers the specified data from a cell to the page register 222. The NAND device 22A becomes in the Busy state during this time period (Step S42).

In contrast, at the same time as the NAND device 22A is being in the Busy state, the command management unit 212 receives a Read command for the NAND device 22B from the NAND control unit 12. Then, the command management unit 212 issues the Read command to the NAND device 22B (Step S43). The command management unit 212 sends a notification to the NAND control unit 12 indicating the completion of the Read command.

When the NAND device 22B receives the Read command, the NAND device 22B transfers the specified data from a cell to the page register 222. The NAND device 22B becomes in the Busy state during this time period (Step S44).

In contrast, at the same time as the NAND device 22B is being in the Busy state, the command management unit 212 receives a Read command for the NAND device 22C from the NAND control unit 12. Then, the command management unit 212 issues the Read command to the NAND device 22C (Step S45). The command management unit 212 sends a notification to the NAND control unit 12 indicating the completion of the Read command.

When the NAND device 22C receives the issued Read command, the NAND device 22C transfers the specified data from a cell to the page register 222. The NAND device 22C becomes in the Busy state during this time period (Step S46).

In contrast, at the same time as the NAND device 22C is being in the Busy state, the command management unit 212 receives a Read command for the NAND device 22D from the NAND control unit 12. Then, the command management unit 212 issues the Read command to the NAND device 22D (Step S47). The command management unit 212 sends a notification to the NAND control unit 12 indicating the completion of the Read command.

When the NAND device 22D receives the issued Read command, the NAND device 22D transfers the specified data from a cell to the page register 222. The NAND device 22D becomes in the Busy state during this time period (Step S48).

When the processes at Steps S42, S44, S46, and S48 end, each of the NAND devices 22A to 22D shifts from the Busy state to the Ready state. When the processes at Steps S42, S44, S46, and S48 end, the state notifying unit 213 notifies the NAND control unit 12 that each of the NAND devices 22A to 22D has shifted from the Busy state to the Ready state. In FIG. 13, the NAND device 22A shifts from the Busy state to the Ready state first. Then, the data transfer management unit 214 receives, from the NAND control unit 12, an instruction to start a data transfer from the page register 222 in the NAND device 22A to the buffer 217. Then, the data transfer management unit 214 performs the data transfer from the page register 222 in the NAND device 22A to the buffer 217 (Step S49). Then, when the data transfer has been completed, i.e., when the process at Step S49 has been completed, the data transfer management unit 214 notifies the NAND control unit 12 of the completion of the data transfer.

Subsequently, the command management unit 212 receives a Read command for the NAND device 22A from the NAND control unit 12. Then, the command management unit 212 issues the Read command to the NAND device 22A (Step S50). The command management unit 212 sends a notification to the NAND control unit 12 indicating the completion of the Read command.

When the NAND device 22A receives the issued Read command, the NAND device 22A transfers the specified data from a cell to the page register 222. The NAND device 22A becomes in the Busy state during this time period (Step S52). Thereafter, when the process at Step S52 has been completed, the state notifying unit 213 notifies the NAND control unit 12 that the NAND device 22A has shifted to the Ready state.

In contrast, when the Read command has been issued, the data transfer management unit 214 receives, from the NAND control unit 12, an instruction to send the data stored in the buffer 217 to the host 1. Then, at the same time as the NAND device 22A is being in the Busy state, the data transfer management unit 214 performs a data transfer from the buffer 217 to the host 1 (Step S51).

Furthermore, the data transfer management unit 214 receives, from the NAND control unit 12, an instruction to start a data transfer from the page register 222 in the NAND device 22B that is in the Ready state to the buffer 218. Then, at the same time as the data transfer from the buffer 217 to the host 1 is being performed, the data transfer management unit 214 performs a data transfer from the page register 222 in the NAND device 22B to the buffer 218 (Step S53). When the data transfer has been completed, i.e., when the process at Step S53 has been completed, the data transfer management unit 214 notifies the NAND control unit 12 of the completion of the data. A description will be given here with the assumption that data to be read is not present any more.

Then, the data transfer management unit 214 receives, from the NAND control unit 12, an instruction to send the data stored in the buffer 218 to the host 1. Then, the data transfer management unit 214 performs a data transfer from the buffer 218 to the host 1 (Step S54).

When the data transfer from the buffer 217 to the host 1 has been completed, i.e., when the process at Step S51 has ended, the data transfer management unit 214 receives, from the NAND control unit 12, an instruction to start a data transfer from the page register 222 in the NAND device 22C that is in the Ready state to the buffer 217. Then, the data transfer management unit 214 performs the data transfer from the page register 222 in the NAND device 22C to the buffer 217 (Step S55). Then, when the data transfer has been completed, i.e., when the process at Step S55 has been completed, the data transfer management unit 214 notifies the NAND control unit 12 of the completion of the data transfer.

Thereafter, the data transfer management unit 214 receives, from the NAND control unit 12, an instruction to send the data stored in the buffer 217 to the host 1. Then, the data transfer management unit 214 performs the data transfer from the buffer 217 to the host 1 (Step S56).

When the data transfer from the buffer 218 to the host 1 has been completed, i.e., when the process at Step S54 has ended, the data transfer management unit 214 receives, from the NAND control unit 12, an instruction to start a data transfer from the page register 222 in the NAND device 22D that is in the Ready state to the buffer 218. Then, the data transfer management unit 214 performs the data transfer from the page register 222 in the NAND device 22D to the buffer 218 (Step S57). When the data transfer has been completed, i.e., when the process at Step S57 has been completed, the data transfer management unit 214 notifies the NAND control unit 12 of the completion of the data transfer.

Then, the data transfer management unit 214 receives, from the NAND control unit 12, an instruction to send the data stored in the buffer 218 to the host 1. Then, the data transfer management unit 214 performs the data transfer from the buffer 218 to the host 1 (Step S58).

Furthermore, when the data transfer from the buffer 217 to the host 1 has been completed, i.e., when the process at Step S56 has ended, the data transfer management unit 214 receives, from the NAND control unit 12, an instruction to start a transfer of data from the page register 222 in the NAND device 22A that is in the Ready state to the buffer 217. Then, the data transfer management unit 214 performs the data transfer from the page register 222 in the NAND device 22A to the buffer 217 (Step S59). When the data transfer has been completed, i.e., when the process at Step S59 has been completed, the data transfer management unit 214 notifies the NAND control unit 12 of the completion of the data transfer.

Thereafter, the data transfer management unit 214 receives, from the NAND control unit 12, an instruction to send the data stored in the buffer 217 to the host 1. Then, the data transfer management unit 214 performs the data transfer from the buffer 217 to the host 1 (Step S60).

At this point, after the timing T2 illustrated in FIG. 13, the time period of the Busy state overlaps with the time period for which another process is being executed. Consequently, after the timing T2, the use efficiency of the buses 23 is almost 100%.

Figure 14:
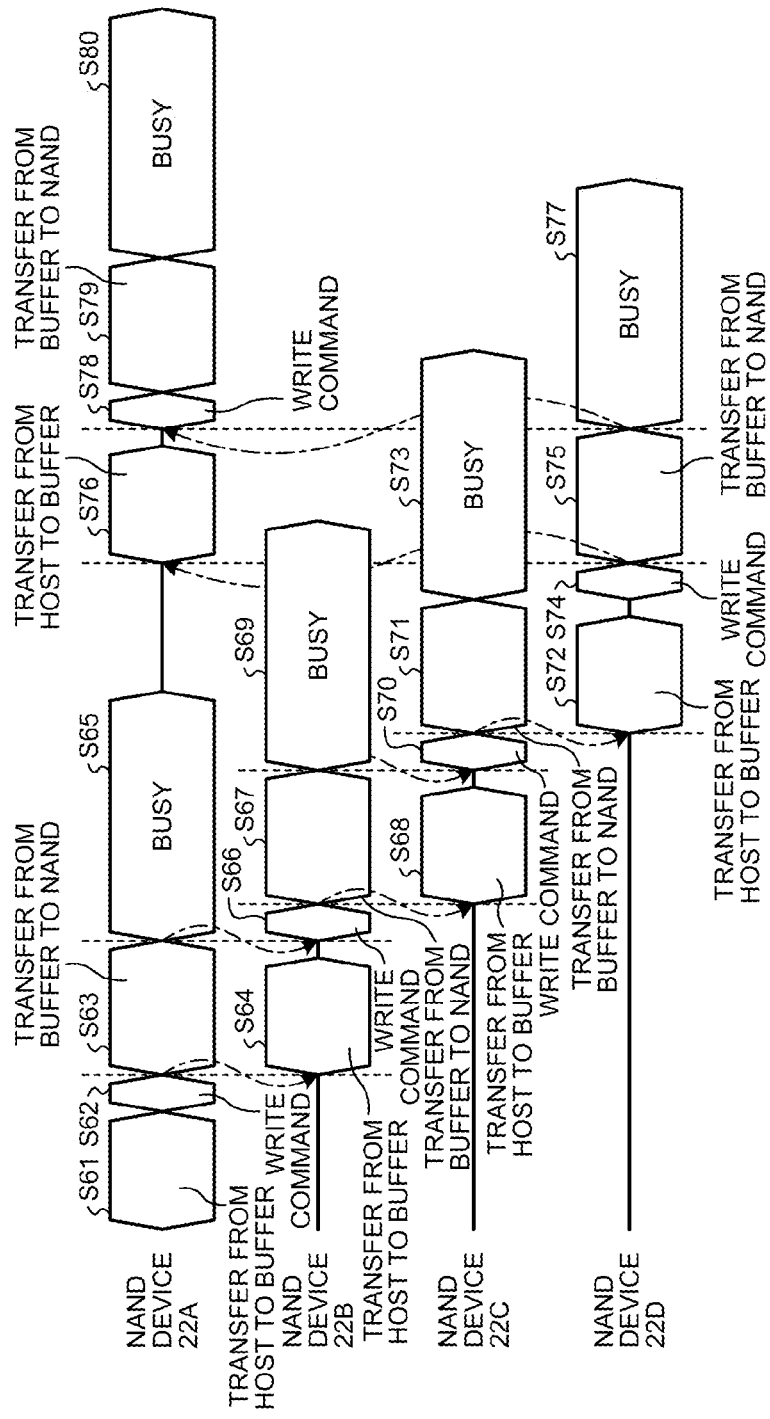
FIG. 14 is a time chart of a data write process performed by the storage system according to the second embodiment.

In the following, the overall flow of the data write process performed by the storage system according to the second embodiment will be described with reference to FIG. 14. FIG. 14 is a time chart of a data write process performed by the storage system according to the second embodiment. The processes illustrated in FIG. 14 are associated with the processes performed by the NAND devices 22A to 22D, which are illustrated on the left side in FIG. 14. Furthermore, the horizontal axis illustrated in FIG. 14 represents the time elapsed. In the second embodiment, a description will be given of a case in which data is written from the four NAND devices 22A to 22D in a single channel. Furthermore, in FIG. 14, the transition of the process is sometimes indicated by the dashed line arrow in order to easy to understand the transition of the process.

The data transfer management unit 214 transfers the data sent from the host 1 to the buffer 217 (Step S61).

Then, the command management unit 212 receives a Write command for the NAND device 22A from the NAND control unit 12. Then, the command management unit 212 issues the Write command to the NAND device 22A (Step S62). The command management unit 212 sends a notification to the NAND control unit 12 indicating that the Write command has been issued.

Thereafter, the data transfer management unit 214 receives, from the NAND control unit 12, an instruction to perform the data transfer from the buffer 217 to the NAND device 22A. Then, the data transfer management unit 214 performs the data transfer from the buffer 217 to the page register 222 in the NAND device 22A (Step S63).

In contrast, at the same time as the data transfer from the buffer 217 to the NAND device 22A is being performed, the data transfer management unit 214 transfers the data sent from the host 1 to the buffer 218 (Step S64).

When the data transfer from the buffer 217 to the NAND device 22A has been completed, the data transfer management unit 214 notifies the NAND control unit 12 of the completion of the data transfer. After the completion of the data transfer, the NAND device 22A transfers the data stored in the page register 222 to a cell. The NAND device 22A becomes in the Busy state during this time period (Step S65). Thereafter, when the process at Step S65 has been completed, the state notifying unit 213 notifies the NAND control unit 12 the NAND device 22A has shifted to the Ready state.

In contrast, after the data transfer from the buffer 217 to the NAND device 22A has been completed, the command management unit 212 receives a Write command for the NAND device 22B from the NAND control unit 12. Then, the command management unit 212 issues the Write command to the NAND device 22B (Step S66). The command management unit 212 sends a notification to the NAND control unit 12 indicating the completion of the Write command.

Thereafter, the data transfer management unit 214 receives, from the NAND control unit 12, an instruction to perform a data transfer from the buffer 218 to the NAND device 22B. Then, the data transfer management unit 214 transfers the data from the buffer 218 to the page register 222 in the NAND device 22B (Step S67).

In contrast, at the same time as the data transfer from the buffer 218 to the NAND device 22B is being performed, the data transfer management unit 214 transfers the data sent from the host 1 to the buffer 217 (Step S68).

When the data transfer from the buffer 218 to the NAND device 22B, the data transfer management unit 214 notifies the NAND control unit 12 of the completion of the data transfer. After the completion of the data transfer, the NAND device 22B transfers the data stored in the page register 222 to a cell. The NAND device 22B becomes in the Busy state during this time period (Step S69). Thereafter, when the process at Step S69 has been completed, the state notifying unit 213 notifies the NAND control unit 12 that the NAND device 22B has shifted to the Ready state.

In contrast, after the data transfer from the buffer 218 to the NAND device 22B has been completed, the command management unit 212 receives a Write command for the NAND device 22C from the NAND control unit 12. Then, the command management unit 212 issues the Write command to the NAND device 22C (Step S70). The command management unit 212 sends a notification to the NAND control unit 12 indicating the completion of the Write command.

Thereafter, the data transfer management unit 214 receives, from the NAND control unit 12, an instruction to perform a data transfer from the buffer 217 to the NAND device 22C. Then, the data transfer management unit 214 transfers the data from the buffer 217 to the page register 222 in the NAND device 22C (Step S71).

In contrast, at the same time as the data transfer from the buffer 217 to the NAND device 22C is being performed, the data transfer management unit 214 transfers the data sent from the host 1 to the buffer 218 (Step S72).

When the data transfer from the buffer 217 to the NAND device 22C has been completed, the data transfer management unit 214 notifies the NAND control unit 12 the completion of the data transfer. After the completion of the data transfer, the NAND device 22C transfers the data stored in the page register 222 to a cell. The NAND device 22C becomes in the Busy state during this time period (Step S73). Thereafter, when the process at Step S73 has been completed, the state notifying unit 213 notifies the NAND control unit 12 that the NAND device 22C has shifted to the Ready state.

In contrast, after the completion of the data transfer from the buffer 217 to the NAND device 22C, the command management unit 212 receives a Write command for the NAND device 22D from the NAND control unit 12. Then, the command management unit 212 issues the Write command to the NAND device 22D (Step S74). The command management unit 212 sends a notification to the NAND control unit 12 indicating that the Write command has been issued.

Thereafter, the data transfer management unit 214 receives, from the NAND control unit 12, an instruction to perform a data transfer from the buffer 218 to the NAND device 22D. Then, the data transfer management unit 214 transfers the data from the buffer 218 to the page register 222 in the NAND device 22D (Step S75).

In contrast, at the same time as the data transfer from the buffer 218 to the NAND device 22D is being performed, the data transfer management unit 214 transfers the data sent from the host 1 to the buffer 217 (Step S76).

When the data transfer from the buffer 218 to the NAND device 22D has been completed, the data transfer management unit 214 notifies the NAND control unit 12 of the completion of the data transfer. After the completion of the data transfer, the NAND device 22D transfers the data stored in the page register 222 to a cell. The NAND device 22D becomes in the Busy state during this time period (Step S77). Thereafter, when the process at Step S73 has been completed, the state notifying unit 213 notifies the NAND control unit 12 that the NAND device 22D has shifted to the Ready state.

In contrast, after the data transfer from the buffer 218 to the NAND device 22D has been completed, the command management unit 212 receives a Write command for the NAND device 22A from the NAND control unit 12. Then, the command management unit 212 issues the Write command to the NAND device 22A (Step S78). The command management unit 212 sends a notification to the NAND control unit 12 indicating the completion of the Write command.

Thereafter, the data transfer management unit 214 receives, from the NAND control unit 12, an instruction to perform a data transfer from the buffer 217 to the NAND device 22A. Then, the data transfer management unit 214 transfers the data from the buffer 217 to the page register 222 in the NAND device 22A (Step S79).

When the data transfer from the buffer 217 to the NAND device 22A has been completed, the data transfer management unit 214 notifies the NAND control unit 12 of the completion of the data transfer. After the completion of the data transfer, the NAND device 22A transfers the data stored in the page register 222 to a cell. The NAND device 22A becomes in the Busy state during this time period (Step S80). Thereafter, when the process at Step S80 has been completed, the state notifying unit 213 notifies the NAND control unit 12 that the NAND device 22A has shifted to the Ready state.

Figure 15:
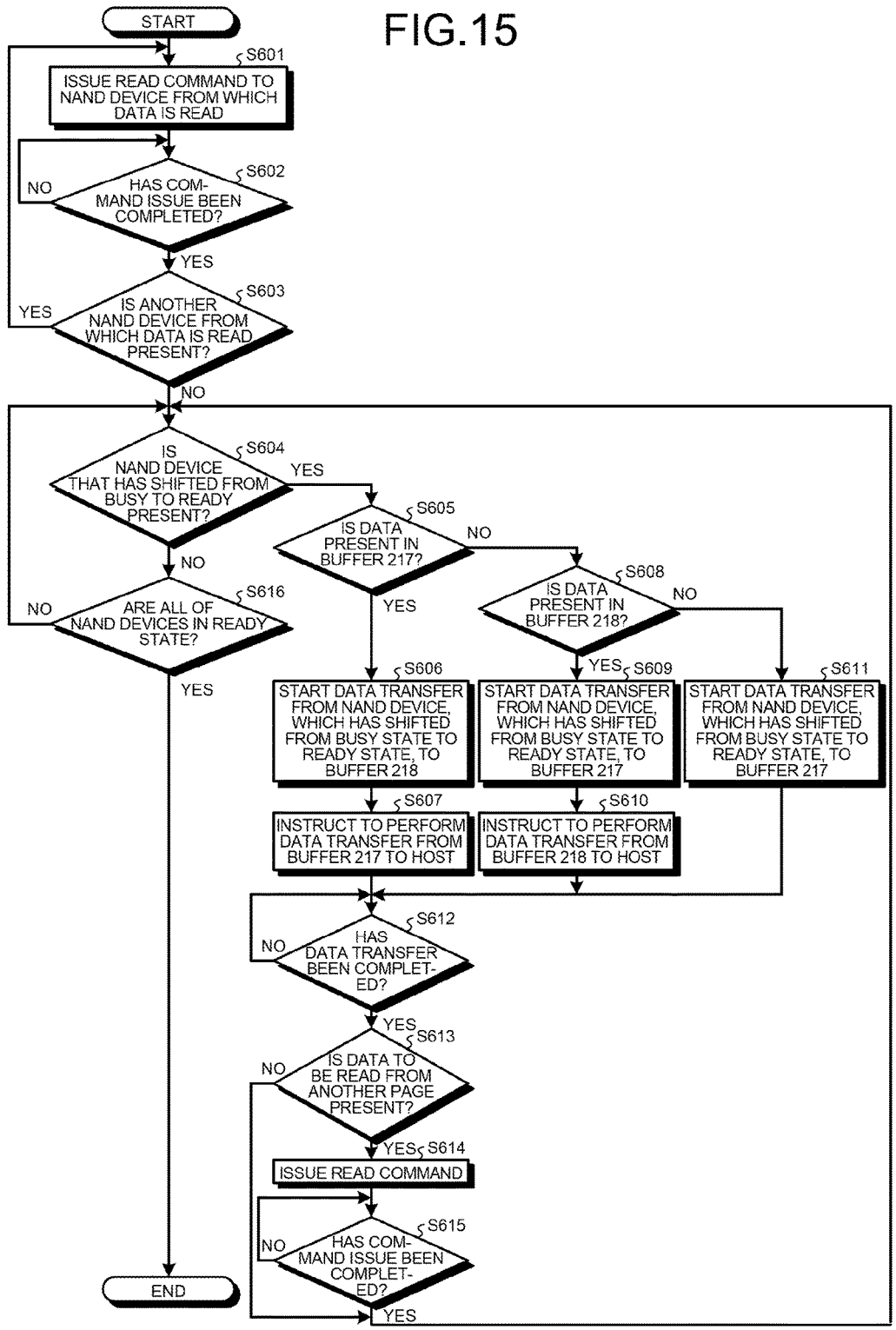
FIG. 15 is a flowchart illustrating the flow of a process performed by a NAND control unit according to the second embodiment when data is read.

In the following, a process performed by the NAND control unit 12 according to the second embodiment when data is read will be described with reference to FIG. 15. FIG. 15 is a flowchart illustrating the flow of a process performed by a NAND control unit according to the second embodiment when data is read.

The NAND control unit 12 issues a Read command to the NAND device 22 from which data is read (Step S601).

Then, on the basis of whether a notification of the completion of a command issue is received from the command management unit 212, the NAND control unit 12 determines whether the command has been issued (Step S602). If the command has not been issued (No at Step S602), the NAND control unit 12 waits until the command has been issued.

In contrast, if the command has been issued (Yes at Step S602), the NAND control unit 12 determines whether another NAND device 22 from which data is to be read is present (Step S603). If another NAND device 22 from which data is to be read is present (Yes at Step S603), the NAND control unit 12 returns to Step S601.

In contrast, the NAND device 22 from which data is to be read is not present (No at Step S603), the NAND control unit 12 determines whether the NAND device 22 that has shifted from the Busy to the Ready is present (Step S604).

If the NAND device 22 that has shifted from the Busy to the Ready is present (Yes at Step S604), the NAND control unit 12 determines whether data is present in the buffer 217 (Step S605).

If data is present in the buffer 217 (Yes at Step S605), the NAND control unit 12 instructs the data transfer management unit 214 to start a data transfer from the NAND device 22, which has shifted from the Busy state to the Ready state, to the buffer 218 (Step S606).

Furthermore, the NAND control unit 12 instructs the data transfer management unit 214 to perform a data transfer from the buffer 217 to the host 1 (Step S607).

In contrast, if no data is present in the buffer 217 (No at Step S605), the NAND control unit 12 determines whether data is present in the buffer 218 (Step S608).

If data is present in the buffer 218 (Yes at Step S608), the NAND control unit 12 instructs the data transfer management unit 214 to start a data transfer from the NAND device 22, which has shifted from the Busy state to the Ready state, to the buffer 217 (Step S609).

Furthermore, the NAND control unit 12 instructs the data transfer management unit 214 to perform a data transfer from the buffer 218 to the host 1 (Step S610).

In contrast, if no data is present in the buffer 218 (No at Step S608), the NAND control unit 12 instructs the data transfer management unit 214 to start a data transfer from the NAND device 22, which has shifted from the Busy to the Ready, to the buffer 217 (Step S611).

On the basis of whether a notification of the completion of the data transfer is received from the data transfer management unit 214, the NAND control unit 12 determines whether the data transfer has been completed (Step S612). If the data transfer has not been completed (No at Step S612), the NAND control unit 12 waits until the data transfer is completed.

In contrast, if the data transfer has been completed (Yes at Step S612), the NAND control unit 12 determines whether data to be read from another page is present in the NAND device 22 that has performed the data transfer (Step S613). If data to be read from another page is not present (No at Step S613), the NAND control unit 12 returns to Step S604.

In contrast, if data is to be read from another page is present (Yes at Step S613), the NAND control unit 12 issues a Read command to the NAND device 22 that has performed the data transfer (Step S614).

Then, on the basis of whether a notification has been received from the command management unit 212 indicating that the command has been issued, the NAND control unit 12 determines whether the command has been issued (Step S615). If the command has not been issued (No at Step S615), the NAND control unit 12 waits until the command is issued.

In contrast, if the command has been issued (Yes at Step S615), the NAND control unit 12 returns to Step S604.

In contrast, if the NAND device 22 that has shifted from the Busy to the Ready state is not present (No at Step S604), the NAND control unit 12 determines whether all of the NAND devices 22 that stores therein data to be read is in the Ready state (Step S616).

If not all of the NAND devices 22 that stores therein data to be read is in the Ready state (No at Step S616), the NAND control unit 12 returns to Step S604.

In contrast, all of the NAND devices 22 that stores therein data to be read is in the Ready state (Yes at Step S616), the NAND control unit 12 ends the data read process.

As described above, the storage system according to the second embodiment reads and writes data by, using a double buffer, overlapping the processes. Consequently, it is possible to improve the use efficiency of a bus and thus it is possible to further improve the efficiency of a data transfer.

[c] Third Embodiment

In the following, a storage system according to a third embodiment will be described. The storage system according to the third embodiment differs from the first embodiment in that an error occurring in a NAND device is detected. The storage system according to the third embodiment is also be represented by the block diagram illustrated in FIG. 3. In a description below, components having the same function as that performed in the first embodiment will not be described.

The NAND control unit 12 includes therein a timer. Furthermore, the NAND control unit 12 measures the time period that has elapsed since the NAND device 22 has shifted to the Busy state.

Then, the NAND control unit 12 determines whether the NAND device 22 that has shifted from the Busy state to the Ready state is present. If the NAND device 22 that satisfies this condition is not present, the NAND control unit 12 acquires the elapsed time period since each of the NAND devices 22 currently in the Busy state becomes in the Busy state. Then, the NAND control unit 12 determines whether there is the NAND device 22 that is in the Busy state for a predetermined time period after the NAND device 22 becomes in the Busy state. If there is the NAND device 22 that is in the Busy state for a predetermined time period after the NAND device 22 becomes in the Busy state, the NAND control unit 12 detects an error in the NAND device 22. The predetermined time period is preferably set in accordance with the performance or the operation state of the storage system. For example, a storage system is designed with the assumption that, if a Busy state continues for a maximum of 100 µs, it is conceivable to set the predetermined time period to, for example, 200 µs by taking into consideration a margin of the operation.

The NAND control unit 12 repeats the error detection until all of the devices are in the Ready state.

If an error is detected, the NAND control unit 12 resets the NAND device 22 in which the error has been detected and retries the process. Furthermore, the NAND control unit 12 notifies the Operating System (OS) or an application running on the host 1 of the error.

However, an error handling performed by the NAND control unit 12 is not limited thereto. Another error handling may also be performed.

Figure 16:
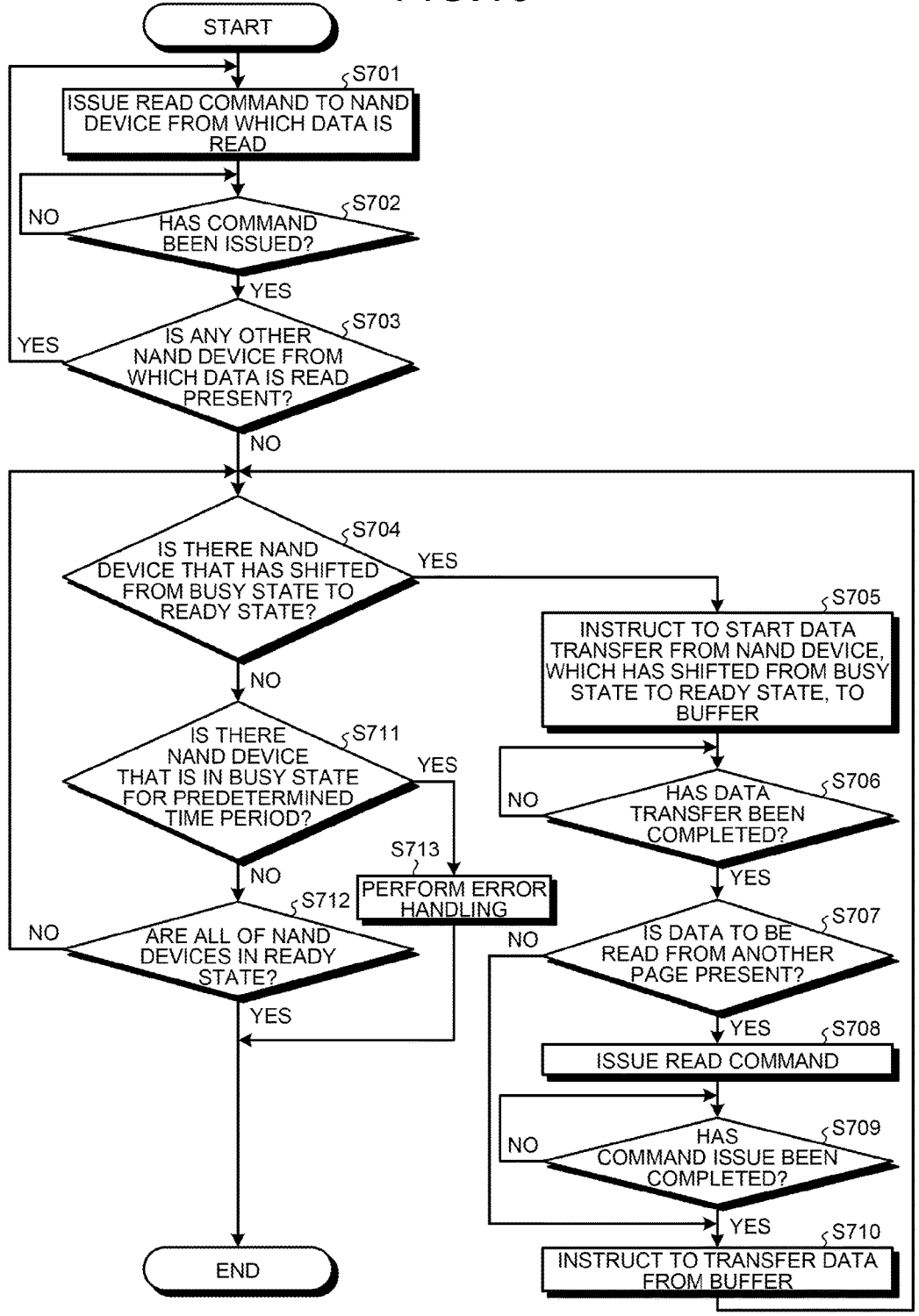
FIG. 16 is a flowchart illustrating the flow of a process performed by a NAND control unit according to a third embodiment when data is read.

In the following, a process performed by the NAND control unit 12 according to the third embodiment when data is read will be described with reference to FIG. 16. FIG. 16 is a flowchart illustrating the flow of a process performed by a NAND control unit according to a third embodiment when data is read.

The processes at Steps S701 to S710 illustrated in FIG. 16 are the same as those at Steps S101 to S110 illustrated in FIG. 6 in the first embodiment; therefore, descriptions thereof will be omitted.

If the NAND device 22 that has shifted from the Busy state to the Ready state is present (No at Step S704), the NAND control unit 12 determines whether there is the NAND device 22 that is in the Busy state for a predetermined time period after the NAND device 22 becomes in the Busy state (Step S711). If there is no NAND device 22 that is in the Busy state for a predetermined time period after the NAND device 22 becomes in the Busy state (No at Step S711), the NAND control unit 12 determines whether all of the NAND devices 22 that store therein data to be read are in the Ready state (Step S712).

If not all of the NAND devices 22 that store therein data to be read are in the Ready state (No at Step S712), the NAND control unit 12 returns to Step S704.

In contrast, if all of the NAND devices 22 that store therein data to be read are in the Ready state (Yes at Step S712), the NAND control unit 12 ends the data read process.

In contrast, if there is the NAND device 22 that is in the Busy state for a predetermined time period after the NAND device 22 becomes in the Busy state (Yes at Step S711), the NAND control unit 12 detects an error occurring in the NAND device 22 that is in the Busy state for a predetermined time period after the NAND device 22 becomes in the Busy state and then performs an error handling (Step S713).

As described above, the storage system according to the third embodiment detects an error in the NAND device that does not shift to the Ready state. Consequently, it is possible to eliminate a waste of the time period for which the NAND device in which an error has occurred becomes in the Ready state. Consequently, it is possible to reduce a delay in a data transfer due to an error and thus the use efficiency of a bus can be improved.

In the embodiments described above, a description has been given of a case in which the bus that connects the NAND controller 21 and the NAND devices 22 is used as a single channel; however, multiple channels may also be used as the bus. If multiple channels are used as the bus, the processes described in the above embodiments are performed in each of the channels.

Figure 17:
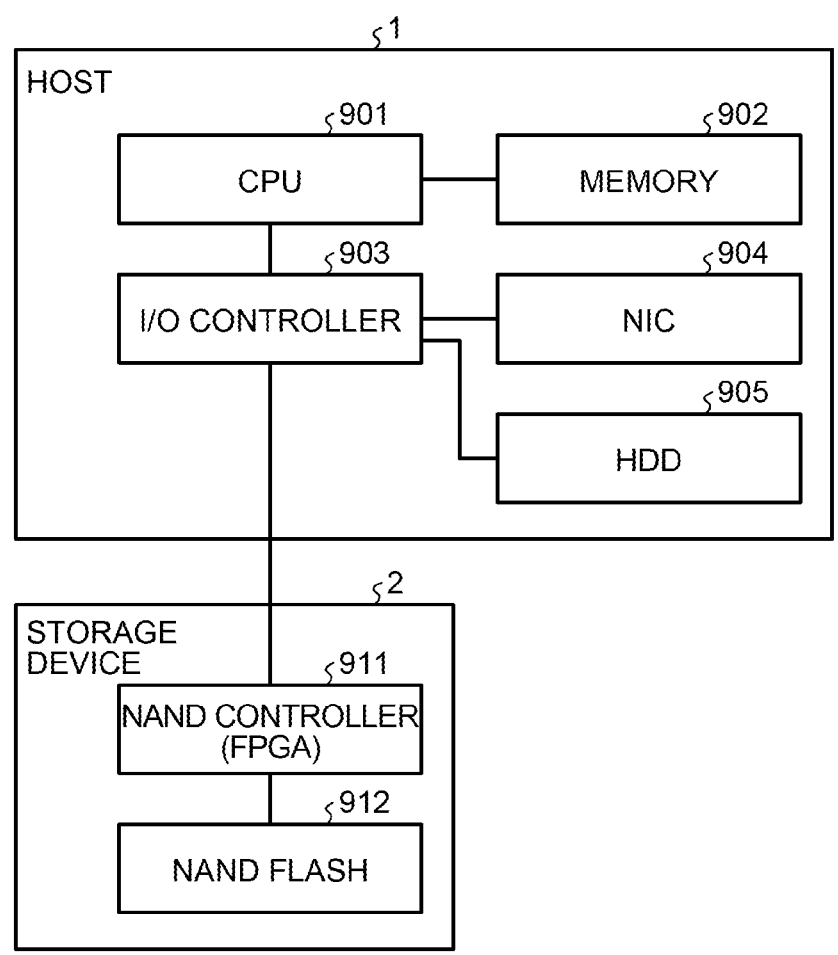
FIG. 17 is a block diagram illustrating the hardware configuration of the storage system.

(Hardware configuration) In the following, the hardware configuration of the storage system according to each of the embodiments will be described with reference to FIG. 17. FIG. 17 is a block diagram illustrating the hardware configuration of the storage system.

As illustrated in FIG. 17, the host 1 includes a central processing unit (CPU) 901, a memory 902, an I/O controller 903, a network interface card (NIC) 904, and a hard disk drive (HDD) 905.

The memory 902 and the I/O controller 903 are connected via the CPU 901 and a bus. Furthermore, the NIC 904 and the HDD 905 are connected to the CPU 901 via the I/O controller 903.

The NIC 904 is an interface for connecting to a network and communicating with an external device.

The HDD 905 stores therein various programs, such as programs that are used to implement the functions performed by the application execution unit 11 and the NAND control unit 12 illustrated, as an example, in FIGS. 3 and 12.

The CPU 901, the memory 902, the I/O controller 903, and the HDD 905 implement the functions performed by the application execution unit 11 and the NAND control unit 12, as an example, in FIGS. 3 and 12.

For example, the CPU 901 reads various programs from the HDD 905 and loads the programs in the memory 902 as the processes that implement the functions performed by the application execution unit 11 and the NAND control unit 12. Then, by executing the processes in the memory 902 by using the memory 902 or the I/O controller 903, the CPU 901 implements various functions performed by, for example, the application execution unit 11 and the NAND control unit 12.

The storage device 2 includes a NAND controller 911 and a NAND flash 912.

The NAND controller 911 and the NAND flash 912 are connected by a bus.

The NAND flash 912 implements the function performed by the NAND device 22.

The NAND controller 911 is formed by using a field programmable gate array (FPGA). The NAND controller 911 implements the functions performed by the command management unit 212, the state notifying unit 213, the data transfer management unit 214, and the buffers 215 to 217.

According to an aspect of an embodiment of the storage system, the storage device, and the control method of the storage system disclosed in the present invention, an advantage is provided in that it is possible to improve the efficiency of a data transfer.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
an arithmetic processing device; and
a storage device, wherein
the storage device includes
  a NAND controller which has a register that temporarily stores the data when a data is read and written; and
  a plurality of storing units each of which has a storing area of data and performs a process which includes reading and writing of the data between the storing area and the register based on a command that is issued from the arithmetic processing device and which are grouped with respect to a plurality of channels,
the NAND controller comprising:
  a command management unit that issues the command from the arithmetic processing device to a storing unit, which is specified by the command and is from among the storing units, and that sends an issue completion notification of the issued command which is issued by the arithmetic processing device to the arithmetic processing device, and
  a notifying unit that notifies, based on whether each of the storing units performs the reading and the witting of the data between the storing area and the register, the arithmetic processing device of an acceptable notification which respectively indicates whether each of the storing units is ready to accept the command which is issued by the arithmetic processing device, and
the arithmetic processing device includes
  an I/O (Input/Output) controller that selects a specific storing unit that is ready to accept the command from among the storing units based on the acceptable notification from the notifying unit when the issue completion notification is received from the command management unit and that sends, to the command management unit, an access command to allow the specific storing unit to perform the process, in parallel with making another storing unit read and write a specific data between the storing area and the register in respective groups.

2. The storage system according to claim 1, wherein the NAND controller further includes a data transfer management unit that executes, when the command is a read command, in response to a data transfer start request from the arithmetic processing device, a data transfer from the specified storing unit to the arithmetic processing device and notifies, when the data transfer is completed, the arithmetic processing device of the transfer completion, and in response to the transfer completion notification received from the data transfer management unit, the I/O (Input/Output) controller sends, to the data transfer management unit based on the acceptable notification associated with the notifying unit, the data transfer start request for a storing unit that is ready to accept the command and that does not currently execute the data transfer.

3. The storage system according to claim 1, wherein the NAND controller further includes a plurality of buffers each of which stores therein data, and a data transfer management unit that executes, when the command is a read command, in response to a data transfer start request from the arithmetic processing device, a data transfer from the specified storing unit to one of the buffers specified by the arithmetic processing device, notifies, when the data transfer to the buffer is completed, the arithmetic processing device of a transfer completion, and that transfers the data stored in the buffer to the arithmetic processing device, and in response to the notification of the transfer completion received from the data transfer management unit, the I/O (Input/Output) controller sends, to the data transfer management unit based on the acceptable notification associated with the notifying unit, the data transfer start request for a storing unit that is ready to accept the command and that does not currently execute the data transfer to the buffer and the information indicating the buffer which has the data for transferring to the arithmetic processing device.

4. The storage system according to claim 1, wherein the I/O (Input/Output) controller determines, based on the acceptable notification associated with the notifying unit, the storing unit that is not able to accept the command even when a predetermined time period elapsed.

5. The storage system according to claim 1, wherein the arithmetic processing device further includes a determining unit that determines whether data to be written has a data pattern in which the data is stored in the storing units in a distributed manner and that sends, when the data to be written has the data pattern in which the data is stored in the storing units in a distributed manner which is a mirroring, a striping or a RAID (Redundant Arrays of Inexpensive Disks), a write command for the data to the I/O (Input/Output) controller.

6. The storage system according to claim 1, wherein the arithmetic processing device includes a processor that issue an specific command which includes an instruction for performing the process at a same time to the storing units, the storage units performs an overlap process based on the specific command.

7. The storage system according to claim 1, wherein the NAND controller has a double buffer is used as the register, the storing unit performs a process which includes reading and writing of the data between the storing area and one buffer in the double buffer based on a command.

8. A storage device comprising:

a NAND controller which has a register that temporarily stores the data when a data is read and written and a plurality of storing unit;

the plurality of storing units each of which has a storing area of data and performs a process which includes reading and writing of the data between the storing area and the register based on a command that is issued from an arithmetic processing device and which are grouped with respect to a plurality of channels; and the NAND controller comprising:

a command management unit that issues the command from the arithmetic processing device, which selects a specific storing unit that is ready to accept the command from among the plurality of storing units based on an acceptable notification when an issue completion notification is received from the command management unit and sends the command to allow the specific storing unit to perform the process, in parallel with making another storing unit read and write a specific data between the storing area and the register in respective groups, to a storing unit which is specified by the command and is from among the plurality of storing units, and that sends the issue completion notification of an issued command which is issued by the arithmetic processing device to the arithmetic processing device; and a notifying unit that notifies, based on whether each of the plurality of storing units performs the reading and the witting of the data between the storing area and the register, the arithmetic processing device of an acceptable notification which respectively indicates whether each of the plurality of storing units is ready to accept the issued command.

9. A control method of a storage system that includes an arithmetic processing device and a storage device that includes a NAND controller which has a register that temporarily stores the data when a data is read and is written, and a plurality of storing units each of which has a storing area of data and which are grouped with respect to a plurality of channels, the control method comprising:

issuing, performed by the NAND controller, a command from the arithmetic processing device to a storing unit, which is specified by the command and is from among the plurality of storing units, and sending an issue completion notification of an issued command which is issued by the arithmetic processing device to the arithmetic processing device;

notifying, performed by the NAND controller, based on whether each of the plurality of storing units performs reading and writing of the data between the storing area and the register, the arithmetic processing device of an acceptable notification which respectively indicates whether each of the plurality of storing units is ready to accept the issued command;

receiving, performed by the arithmetic processing device, an issue completion notification from the NAND controller and selecting a specific storing unit that is ready accept the command from among the plurality of storing units based on the acceptable notification from the NAND controller; and sending, to the NAND controller, performed by the arithmetic processing device, an access command to allow the specific storing unit to perform the process, in parallel with making another storing unit read and write a specific data between the storing area and the register in respective groups.

\* \* \* \* \*